US009605998B2

(12) United States Patent
Nozawa

(10) Patent No.: US 9,605,998 B2
(45) Date of Patent: Mar. 28, 2017

(54) MEASUREMENT SYSTEM

(71) Applicant: Panasonic Intellectual Property Management Co., Ltd., Osaka (JP)

(72) Inventor: Katsuya Nozawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 90 days.

(21) Appl. No.: 14/825,304

(22) Filed: Aug. 13, 2015

(65) Prior Publication Data

US 2016/0061655 A1 Mar. 3, 2016

(30) Foreign Application Priority Data

Sep. 3, 2014 (JP) ................................. 2014-178878
Jul. 24, 2015 (JP) ................................. 2015-146870

(51) Int. Cl.
*G01J 1/04* (2006.01)
*G01S 17/32* (2006.01)
(Continued)

(52) U.S. Cl.
CPC .......... *G01J 1/0407* (2013.01); *G01S 7/4802* (2013.01); *G01S 7/487* (2013.01); *G01S 7/493* (2013.01);
(Continued)

(58) Field of Classification Search
CPC .... G01J 1/0407; G01S 7/4802; G01S 7/4917; G01S 17/32; G01S 17/936; G02F 1/35; G02F 1/355
(Continued)

(56) References Cited

U.S. PATENT DOCUMENTS 9,097,656 B2 * 8/2015 Fermann ............ G01N 33/0027
2011/0170172 A1 * 7/2011 Mizushima ............ G02F 1/353
359/326
(Continued)

FOREIGN PATENT DOCUMENTS

JP 11-044573 2/1999
JP 2006-172210 6/2006
(Continued)

OTHER PUBLICATIONS

Katsutoshi Ochiai et al., "Development of the Laser Radar Surveillance System Technology at Long-distances with High-resolution Under Inclement Weather" Mitsubishi Heavy Industries, Ltd. Technical Review vol. 42 No. 5, Dec. 2005.

*Primary Examiner* — Seung C Sohn
(74) *Attorney, Agent, or Firm* — McDermott Will & Emery LLP

(57) ABSTRACT

A measurement system, comprising: a first light source that generates first light and irradiates an object with the first light, at least one of an intensity, a polarization state, and a wavelength being modulated with a first period in the first light; a second light source that generates second light, at least one of an intensity, a polarization state, and a wavelength being modulated with a second period in the second light; a first optical system that mixes light from the object based on the first light with the second light; a nonlinear optical crystal that generates third light from the mixed light by sum-frequency generation phenomenon, the third light having a frequency equivalent to a sum of a frequency of the light from the object based on the first light and a frequency of the second light; and a photodetector that measures an intensity of the third light.

15 Claims, 17 Drawing Sheets

(51) Int. Cl.
*G01S 17/10* (2006.01)
*G01S 17/36* (2006.01)
*G01S 17/89* (2006.01)
*G01S 17/93* (2006.01)
*G01S 7/48* (2006.01)
*G01S 7/487* (2006.01)
*G01S 7/493* (2006.01)
*G01S 7/499* (2006.01)
*G01S 7/491* (2006.01)
*G02F 1/35* (2006.01)

(52) U.S. Cl.
CPC ............ *G01S 7/499* (2013.01); *G01S 7/4917* (2013.01); *G01S 17/10* (2013.01); *G01S 17/107* (2013.01); *G01S 17/32* (2013.01); *G01S 17/36* (2013.01); *G01S 17/89* (2013.01); *G01S 17/936* (2013.01); *G02F 1/3534* (2013.01)

(58) Field of Classification Search
USPC ...................................... 250/578.1
See application file for complete search history.

(56) References Cited

U.S. PATENT DOCUMENTS

2011/0267671 A1* 11/2011 Peng ................ H01S 3/005
  359/257
2014/0301417 A1* 10/2014 Kane ................ H01S 3/11
  372/21

FOREIGN PATENT DOCUMENTS

| JP | 2010-181193 | 8/2010 |
| JP | 2013-108771 | 6/2013 |

\* cited by examiner

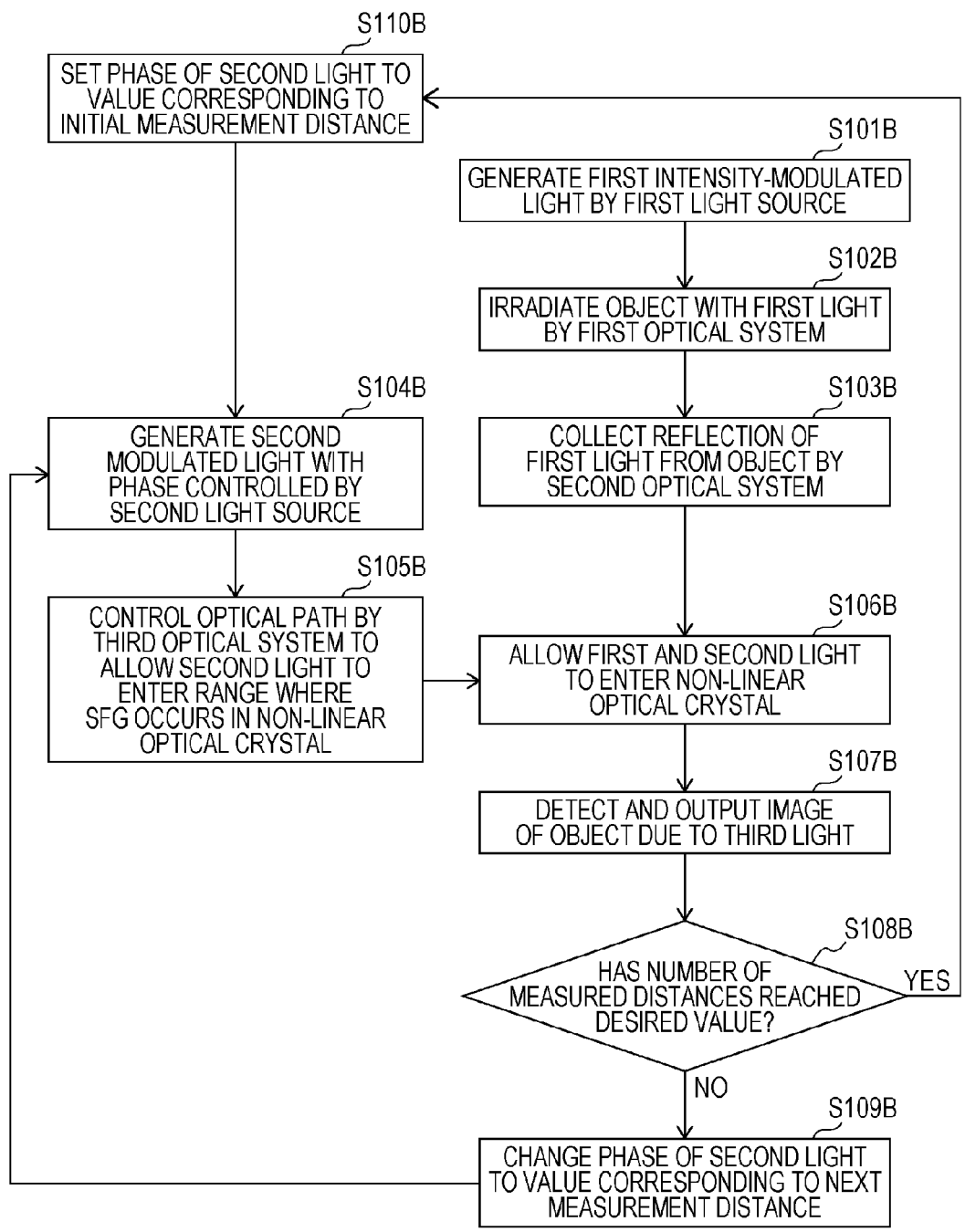

MEASUREMENT SYSTEM

BACKGROUND

1. Technical Field

The present application relates to a measurement system.

2. Description of the Related Art

A technique to visualize or a technique to detect a pedestrian and an obstacle (hereinafter may be referred to as an "object") is important to improve the safety of automobiles. An image pickup system using a range gate camera is known as a representative instance. The range gate camera is a camera that is designed to have exposure (the gate is opened) only for an extremely short specific time. It is possible to pick up an image of only an object at a predetermined distance by a combination of a range gate camera and pulsed irradiation light. With a range gate camera, an adverse effect of a fog which is present in front of an object may be eliminated. A range gate camera also functions as a time of flight (TOF) image pickup system by successively changing gate opening timing. A range gate camera is disclosed in, for instance, in Mitsubishi Heavy Industries Technical Review Vol. 42, No. 5, P. 212 (2005-12).

SUMMARY

In the related art described above, reflection light from an object due to irradiation light is detected. When reflection light is detected, other light sources except for the irradiation light and ambient light such as sunlight have an adverse effect on the detection of the reflection light.

One non-limiting and exemplary embodiment provides a measurement system that reduces an effect of ambient light and that is applicable to highly accurate measurement.

In one general aspect, the techniques disclosed here feature a measurement system, comprising: a first light source that generates first light and irradiates an object with the first light, at least one of an intensity, a polarization state, and a wavelength being modulated with a first period in the first light; a second light source that generates second light, at least one of an intensity, a polarization state, and a wavelength being modulated with a second period in the second light; a first optical system that mixes light from the object based on the first light with the second light to generate mixed light; a nonlinear optical crystal that generates third light from the mixed light by sum-frequency generation phenomenon, the third light having a frequency equivalent to a sum of a frequency of the light from the object based on the first light and a frequency of the second light; and a photodetector that measures an intensity of the third light.

It should be noted that general or specific embodiments may be implemented as an element, a device, a system, an integrated circuit, or a method. It should be noted that general or specific embodiments may be implemented as any selective combination of an element, a device, a system, an integrated circuit, and a method.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a flow chart illustrating the operation of the TOF image pickup system according to the exemplary second embodiment;

DETAILED DESCRIPTION

Figure 1:
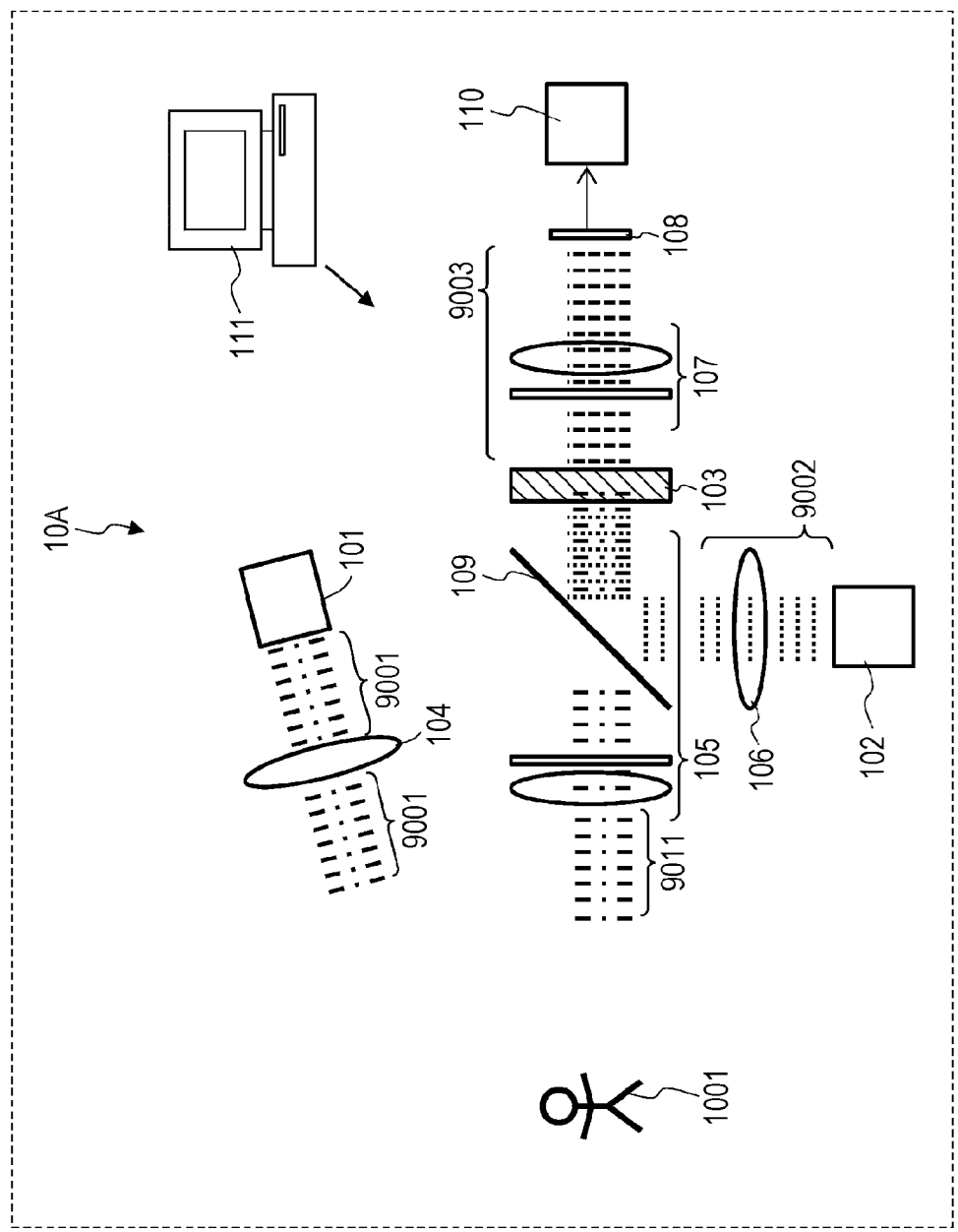
FIG. 1 is a schematic diagram of TOF image pickup system according to an exemplary first embodiment.

As a technique for visualizing or detecting a pedestrian(s) and an obstacle(s), the following techniques other than the above-described technique are known, for instance.

The first technique is a camera system using a normal image sensor. In this system, an object, which is irradiated with light such as sunlight, road light, or headlight, is picked up by a camera. The camera includes, for instance, an optical system including a lens, and an image sensor such as a charge coupled device (CCD). The image sensor itself does not have a function of detecting a pedestrian(s) and an obstacle(s) or a function of determining distances to them. A pedestrian(s) and an obstacle(s) are detected by performing image recognition processing on an image which is obtained by the image sensor. In some cases, the distance to each of them is estimated. The image sensor itself does not have to have a ranging function, and thus a low speed image sensor having a simple structure may be utilized.

The second technique is called light detection and ranging (LIDAR). The LIDAR is a technique that measures the distance to an object. In this technique, irradiation light is reflected by an object and a time taken for the reflection light to reach a detector, that is, time of flight is measured. In order to measure the time of flight of light, the intensity of irradiation light is modulated. The detector has a function of detecting the phase difference between the phase of the intensity-modulated irradiation light and the phase of the intensity-modulated reflection light. The phase difference corresponds to the time of flight, and thus ranging may be performed based on the phase difference. However, an object is detectable only if the object is in a direction of beam radiation, and thus spatial resolution is not sufficient. For this reason, to assure the spatial resolution, a scanning mechanism that changes the direction of beam radiation is added.

The third technique is TOF image pickup system using a TOF image sensor. Each pixel of the TOF image sensor has a function of measuring an intensity phase difference. Each pixel functions as a lidar. Each pixel has a ranging function and also has an image pick-up function like a normal camera system. The images of a pedestrian(s) and an obstacle(s) may be picked up by a combination of a TOF image sensor and a irradiation device that irradiates a wide range of space with light that is intensity modulated. Simultaneously, the distances to the pedestrian(s) and obstacle(s) may be measured.

Hereinafter, the problems of conventional techniques, reviewed by the inventor will be described.

With the first technique described above, bad weather may have an adverse effect on image pick-up. For instance, light scattering due to the presence of fog and/or raindrops between an object and a camera has an adverse effect on image pick-up. For this reason, it is difficult to form a clear image of the object.

With both the second and third techniques, ranging is performed by irradiating an object with intensity-modulated irradiation light and detecting a reflection light from the object.

However, the object is not usually irradiated with only the intensity-modulated irradiation light that is prepared for ranging. For instance, the object is also irradiated with unmodulated light (also referred to as ambient light) such as sunlight, a street light, or a headlight of a vehicle. In order to perform ranging with high accuracy, only modulated component has to be extracted by removing the ambient light component. It is theoretically possible to remove the ambient light component. For instance, only ambient light component is measured and the difference between the modulated component and the ambient light component may be obtained. However, practically, sensitivity saturation due to the ambient light occurs during daytime when the ambient light is intense, and therefore, extraction of the modulated component is difficult.

Figure 2:
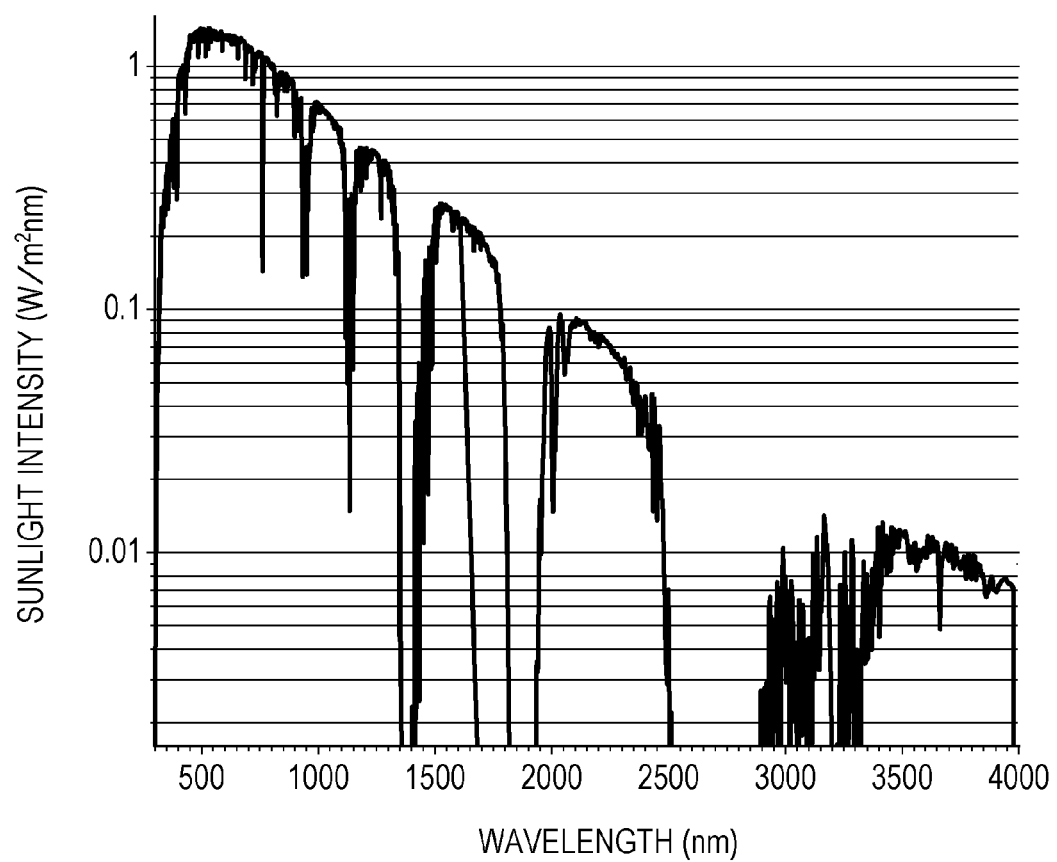
FIG. 2 is a graph illustrating the spectrum of sunlight.

FIG. 2 illustrates the spectrum of sunlight. The intensity of sunlight decreases as the wavelength increases. Therefore, in the near-infrared range, in contrast to the visible range, the ambient light due to sunlight is less. Particularly, sunlight with a wavelength around 1400 nm and sunlight with a wavelength around 1900 nm are absorbed by the atmosphere, and thus hardly reach the Earth's surface. Therefore, an adverse effect of the ambient light may be reduced by using light with these wavelengths for ranging. Consequently, improvement in ranging accuracy is expectable. The visible range indicates a wavelength range of 400 to 700 nm approximately. The near-infrared range indicates a wavelength range of 700 to 2500 nm approximately.

However, in order to perform ranging using the second and third techniques, high-speed operation of the image sensor is needed. For instance, the phase difference caused by an optical path difference of 1 m is equivalent to only 3.3 nanoseconds. Therefore, the detector or the image sensor has to have an operation speed of approximately several hundred MHz. With the second technique, it is possible to utilize the detector using a compound semiconductor. However, the third technique has no other choice but to utilize an image sensor (hereinafter referred to as a "silicon image sensor") that uses silicon, as a TOF image sensor. This is because the TOF image sensor has to have a high operation speed as well as performance of complicated operation processing.

However, the silicon image sensor has a small absorption coefficient on the range of infrared rays. For this reason, highly sensitive measurement is not possible with the silicon image sensor in the near-infrared range. In addition, the silicon image sensor has no sensitivity in a wavelength band (hereinafter referred to as a "sunlight lacking wavelength band") that lacks the wavelength of sunlight. For this reason, it is not possible for the silicon image sensor to pick up an image at all in the sunlight lacking wavelength band.

Also, the above-described range gate camera has to have a mechanism to keep the gate open only for a limited time period. For in-vehicle application, axial resolution of approximately 1 m is needed, and thus the time period during which the gate is open needs to be limited to approximately several nanoseconds. However, no physical shutter achieves such a high speed operation. Therefore, the high speed operation needs to be achieved using a high speed operable electronic shutter of the image sensor. However, similarly to the problem of the above-described third technique, an image sensor that is operable at a high speed is the silicon image sensor only. Consequently, a wavelength range that allows operation is limited. In view of such a problem, the inventor has devised a TOF image pickup system that has a novel structure.

An image pickup system according to an aspect of the present disclosure is capable of reducing the adverse effect of the ambient light and performing ranging with high accuracy. Also, it is possible to provide a TOF image sensor that functions even in the near-infrared range which allows an operation with high safety.

Hereinafter, a specific embodiment of the present disclosure will be described with reference to the drawings. In the following description, the same or similar components are labeled with the same reference symbol. Also, redundant description may be omitted. It is to be noted that the image pickup system according to the embodiments of the present disclosure is not limited to what is illustrated below.

First Embodiment

Hereinafter, the structure and the function of TOF image pickup system 10A will be described with reference to FIGS. 1 and 2.

FIG. 1 schematically illustrates the configuration of the TOF image pickup system 10A according to the present embodiment. It is to be noted that this configuration diagram illustrates only the elements necessary to describe the present disclosure. Also, the configuration diagram is strictly a diagram illustrating the concept. The shape, aspect ratio, and scale of each element in reality are not taken into consideration at all.

The TOF image pickup system 10A includes a first light source 101, a second light source 102, a nonlinear optical crystal 103, a first optical system 104, a second optical system 105, a third optical system 106, a fourth optical system 107, an image sensor 108, an optical mixing element 109, a processor 110, and a controller 111. A light source unit includes the first light source 101 and the second light source 102. The controller 111 may be provided in the light source unit. The TOF image pickup system 10A functions as a measurement system. The processor 110 processes an output signal from the TOF image pickup system 10A. It is to be noted that the TOF image pickup system 10A may not include the processor 110. In this case, the processor 110 may be built in the controller 111.

The first light source 101 generates and emits first modulated light 9001. In more specific description, the first light source 101 is capable of generating first light 9001 in which at least one of the intensity, the polarization state, and the wavelength changes periodically on the time axis. The same is the case with the second light source 102 described below. "At least one of the intensity, the polarization state, and the wavelength changes periodically on the time axis" indicates that at least one of the intensity, the polarization state, and the wavelength changes periodically as the time elapses, that is, modulation of light. The phase of modulation indicates a position in one period at a certain time in periodic change. The phase of modulation of the first light 9001 may be set to a predetermined value by the control of the controller 111 described later. In the present specification, "the phase of modulation of the first light 9001" may be called "the phase of the first light source 101".

In the following description, the first light source 101 generates irradiation light (the first light 9001) having a predetermined wavelength. The irradiation light may be, for instance, laser light or pulsed light. The first light source 101 irradiates an object 1001 with the first light 9001. The first light source 101 may be, for instance, similar to a light source used for an image pickup system that utilizes a normal TOF image sensor. That is, the first light source 101 outputs the first light 9001 with modulated intensity. In other words, the first light source 101 generates the first light 9001 with periodically changing intensity on the time axis.

As the first light source 101, it is possible to utilize, for instance, a light source that spontaneously outputs light with periodically changing intensity on the time axis, like a mode-locked laser. The first light source 101 may be achieved by a combination of a light source like a diode laser capable of modulating the intensity by a current amount inputted and a mechanism that controls the current amount. Optionally, the first light source 101 may be achieved by a combination of a light source that outputs light with a uniform intensity and an element that modulates transmitted light, such as an electro optic modulator or an acoustic-optical element, for instance. The electro optic modulator or the acoustic-optical element may be disposed between the light source that outputs light with a uniform intensity and the first optical system 104.

The wavelength of the first light 9001 is set in a range in which sum frequency generation (SFG) phenomenon occurs between the first light 9001 and second light 9002 by the nonlinear optical crystal 103 described later. Any wavelength in this range may be selected. The range may be determined, for instance, by the type, temperature of the nonlinear optical crystal 103 and the wavelength of the second light 9002. By combining those conditions appropriately, the wavelength of the first light 9001 may be selected from a wide range from the ultraviolet to the far-infrared.

In this manner, the present disclosure may be implemented in a wide wavelength range. However, from several viewpoints, some wavelengths are advantageous for implementation of the present disclosure, and thus those viewpoints and wavelengths will be described. For implementation of the present disclosure, the wavelength of the first light 9001 may be in a range from the ultraviolet to the far-infrared and is not limited to in the wavelength range indicated below.

The first viewpoint is the sunlight spectrum. Also in implementation of the present disclosure, similarly to a normal TOF image sensor system, when light in a wavelength band with less ambient light is used as irradiation light, accuracy of ranging may be increased. That is, it is desirable to select the near-infrared range rather than the visible range as the wavelength band of the first light 9001. In particular, it is desirable to select the sunlight lacking wavelength band as the wavelength band of the first light 9001. It is to be noted that in the present disclosure, the wavelength of the irradiation light from the first and second light sources is different from the wavelength of the light that reaches the image sensor 108 as described later. For this reason, it is possible select a wavelength of the irradiation light without considering the sensitivity range of the image sensor 108.

The second viewpoint is allowable light intensity. An object is irradiated with the first light 9001 to measure the distance to the object. The accuracy of ranging increases as the irradiation intensity is increased because the irradiation light is easier to be distinguished from ambient light.

However, the object may include a pedestrian(s) and the driver(s) of other vehicles. For this reason, an upper limit of the strength of available light is determined in consideration of an effect of irradiation light on the persons. For instance, when a vehicle coming in the opposite direction is irradiated with intense visible light, the driver of the vehicle may have difficulty in driving. An upper limit of allowable light intensity varies with wavelengths. The human eye has no sensitivity to the infrared range. Therefore, the driver is not likely to be dazzled by irradiation with intense infrared light. In the near-infrared wavelength band of 1.4 micrometers or more, light is absorbed by crystalline lens and is not likely to be focused to form an image on the retina. The wavelength band is called an eye safe wavelength, and utilization of light in the wavelength band further increases safety. This is an important viewpoint when the first light 9001 is generated using a laser.

An area to be picked up by the TOF image pickup system 10A is irradiated with light by the first optical system 104. The object 1001 to be ranged is irradiated with the first light 9001 through the first optical system 104. The first optical system 104 may include optical elements such as a lens, an optical fiber, and a mirror.

It is to be noted that the first light source 101 may have both functions of the light source and the optical system described above. That is, the first light source 101 may generate the first intensity-modulated light 9001 and may emit the first light 9001 directly to an object.

In the present disclosure, the light which is allowed to enter the nonlinear optical crystal 103 through the optical mixing element 109 may be various pieces of light that are generated from the object 1001 based on the first light 9001. In more specific description, the light may be reflected light from the object 1001, transmitted light through the object 1001, or the fluorescence of the object 1001. That is, the light 9011 is not limited to the reflection light from the object 1001. However, in the present description, the light 9011 is described as the reflection light from the object 1001.

The second optical system 105 allows the reflection light 9011 to enter the nonlinear optical crystal 103 through the optical mixing element 109. The reflection light 9011 is reflected light of the first light 9001, reflected from the object 1001. The second optical system 105 along with the later-described fourth optical system 107 plays a role of forming an image of the object in the image sensor 108. Similarly to the first optical system 104, the second optical system 105 may also include optical elements such as a lens, an optical fiber, and a mirror.

The second optical system 105 has a function of blocking light from entering the nonlinear optical crystal 103, the light having the same wavelength as the third light 9003 present in image pick-up environment. The third light 9003 is light of the sum frequency generated from SFG in the nonlinear optical crystal 103. The details of the third light 9003 will be described later. The wavelength of the reflection light 9011 is different from the wavelength of the third light 9003. Thus, in order to have such a blocking function, a spectroscopic element such as an interference or absorption optical filter, or a spectrum prism, a diffraction grating may be used. However, this function may not be provided when it is known that the light having the same wavelength as the third light 9003 is substantially not present in the image pick-up environment.

When the second light 9002 is polarization-modulated light, it is desirable that the second optical system 105 include a polarizer that allows only the component of the reflection light 9011 in a specific polarization direction to pass through as described later. When the second light 9002 is strength-modulated light or wavelength-modulated light, a polarizer may not be provided.

The second light source 102 generates the second light 9002 in which at least one of the intensity, the polarization state, and the wavelength changes periodically on the time axis. The second light source 102 emits the second light 9002 in which at least one of the intensity, the polarization state, and the wavelength is modulated, while varying the phase of the modulation. The phase of modulation of the second light 9002 may be set to a predetermined value by the control of the controller 111 described later. Similarly to the first light 9001, "the phase of modulation of the second light 9002" may be called "the phase of the second light source 102". Similarly to the first light source 101, as the second light source 102, for instance, a mode-locked laser or a diode laser may be utilized.

The optical path of the second light 9002 is controlled by the optical mixing element 109, and the second light 9002 enters the nonlinear optical crystal 103. When the reflection light 9011 and the second light 9002 enter the nonlinear optical crystal 103 simultaneously, SFG phenomenon occurs and the third light 9003 is generated. The wavelength of the second light 9002 is selected to satisfy what is called a phase matching condition for efficient occurrence of SFG phenomenon. The wavelength of the second light 9002 is selected so as to be different from the wavelength of the first light 9001. The phase matching condition is determined based on the type, crystal orientation, and temperature of the selected nonlinear optical crystal 103 and on the wavelength of the first light. The phase matching condition will be described later.

The second light source 102 generates and emits the second modulated light 9002. As the second light source 102, a light source capable of varying the phase of modulation or the modulated waveform may be selected. The second light 9002 may be intensity-modulated light as described above. The second light 9002 may be polarization-modulated light or wavelength-modulated light as long as the below-described phase matching condition is affected. That is, the modulation of the second light 9002 may be performed for one of the intensity, the polarization state, and the wavelength.

As an intensity modulation method, the modulation method described and applied to the first light source 101 may be used.

Polarization state modulation method includes a method in which the polarization plane of linearly polarized light, for instance, is changed using an electro optic element. The method achieves a high speed operation, and thus is suitable for implementation of the present disclosure.

The linearly polarized light is easily obtained by using a polarization laser, for instance. Alternatively, non-polarized light may be converted to linearly polarized light by utilizing a polarizer (for instance, a linear polarizer) that allows light oscillating only in a specific direction to pass through.

As the polarization state modulation method, a method is suitable in which an electro optic element composed of lithium niobate, for instance, is used because the method achieves a high speed operation. An electro optic element is capable of changing the angle of the polarization plane of transmitted light according to an electrical signal applied. The second polarization-modulated light 9002 is obtainable by using such an electro optic element. It is to be noted that when low-speed modulation is allowed, the second light 9002 with modulated polarization state may be obtained by applying a polarizer to non-polarized light, the polarizer being capable of adjusting an angle of a polarization plane.

Wavelength modulation method includes a method that uses a variable wavelength laser, for instance. The variable wavelength laser is capable of varying the phase of modulation or the modulated waveform by changing the resonance wavelength of a resonator, for instance. The wavelength may be modulated by an electro optic element. In this case, the phase of modulation or the modulated waveform may be varied by changing an electrical signal applied to the electro optic element.

It is difficult to apply one of the above-described methods to an originally modulated light source like a mode-locked laser. However, even in this case, the phase of modulation may be changed by varying an optical path length using a mechanism to have a variable optical path length, what is called, an optical delay line. In this manner, it is possible for the second light source 102 to change the phase of the modulation of the second light 9002. As described above, having a variable phase of modulation of the first light 9001 in the first light source 101 is also in the range of the present disclosure.

The third optical system 106 allows the second light 9002 emitted from the second light source 102 to enter the nonlinear optical crystal 103 through the optical mixing element 109. Similarly to the first and second optical systems 104, 105, the third optical system 106 includes optical components such as a lens and a curved mirror.

The reflection light 9011 and the second light 9002 enter the nonlinear optical crystal 103 so as to be superimposed on each other. The both optical paths may be superimposed on each other efficiently by utilizing the optical mixing element 109. The optical mixing element 109 reflects one light and allows the other light to pass through. It is desirable to use what is called a dichroic mirror as the optical mixing element 109. Both optical axes may be superimposed on each other using a polarization beam splitter that utilizes a difference in polarization between the reflection light 9011 and the second light 9002. Optionally, both optical axes may be superimposed on each other using a half mirror. However, when a half mirror is used, the efficiency may be probably low because some light is not available when the both optical axes are superimposed on each other.

The nonlinear optical crystal 103 generates light with a different wavelength from that of the entered light. The crystal having such characteristics includes, for instance, barium borate (BBO), lithium triborate (LBO), KTP, and lithium niobate. SFG phenomenon is a phenomenon in which when light beams with two wavelengths enter the nonlinear optical crystal 103 simultaneously, light with the sum of the frequencies of the two light beams is generated. It is to be noted that SFG phenomenon occurs with sufficient efficiency only when the phase matching condition is satisfied. The phase matching condition is given by the following Expression 1.

$$n3/\lambda 3 = n1/\lambda 1 + n2/\lambda 2 \quad \text{(Expression 1)}$$

where $\lambda 1$ is the wavelength of the light 9011 generated from the object based on the first light 9001. In the case of reflected light and transmitted light, the wavelength of the light does not change, and thus the wavelength of the light 9011 is the same as the wavelength of the first light 9001. In the case of fluorescence light, the wavelength of the light 9011 may be different from the wavelength of the first light 9001. In this case, the wavelength $\lambda 1$ is the wavelength of the fluorescence light. In the following, the case will be described in which the light 9011 is reflected light. However, the present disclosure may be implemented similarly in the case where the light 9011 is fluorescence light. $\lambda 2$ is the wavelength of the second light 9002. $\lambda 3$ is the wavelength of the third light 9003. n1 is the refractive index of the nonlinear optical crystal 103 in wavelength and polarization state of the light 9011. n2 is the refractive index of the nonlinear optical crystal 103 in wavelength and polarization state of the second light 9002. n3 is the refractive index of the nonlinear optical crystal 103 in wavelength and polarization state of the third light 9003. n1, n2, and n3 become settled with the type of nonlinear optical crystal 103, a crystal azimuth, and temperature. The wavelength and the polarization state of the first light 9001, the wavelength and the polarization state of the second light 9002, and the type, orientation, and temperature of the nonlinear optical crystal 103 are selected so that the phase matching condition is satisfied.

In the phase matching condition, when SFG phenomenon occurs, the intensity of generated light is proportional to the intensities of the light beams with two original wavelengths. That is, when the third light 9003 occurs due to the SFG phenomenon based on the reflected wave 9011 of the first light 9001 and the second light 9002, the intensity of the third light 9003 is proportional to the intensity of the component which is of the reflected wave 9011 of the first light 9001 and which satisfies the phase matching, and the intensity of the component which is of the second light 9002 and which satisfies the phase matching.

This indicates that the nonlinear optical crystal 103 has a function of converting the reflected wave 9011 of the first light 9001 to the third light 9003. It is also indicated that the conversion efficiency is made variable according to the intensity of the component which is of the second light 9002 and which satisfies the phase matching.

It is to be noted that SFG phenomenon may occur only when the phase matching condition is satisfied. Therefore, when the wavelength or polarization state is modulated even with a fixed intensity of the second light 9002, SFG phenomenon may occur only while the phase matching condition is satisfied for variation in the wavelength or polarization state. While the phase matching condition is satisfied, the third light 9003 is generated that has an intensity proportional to the intensity of the component which is of the original light and which satisfies the phase matching.

In the SFG phenomenon, the wavelength of the reflected wave 9011 which is the same as the wavelength of the first light 9001, the wavelength of the second light 9002, and the wavelength of the third light 9003 are satisfy the relationship in the following Expression 2.

$$1/\lambda 3 = 1/\lambda 1 + 1/\lambda 2 \quad \text{(Expression 2)}$$

As is apparent from Expression 2, the wavelength of the third light 9003 has to be shorter than the wavelength of the first and second light 9001, 9002. For instance, when the wavelength of the first light 9001 is 1450 nm and the wavelength of the second light 9002 is 1064 nm, the wavelength of the third light 9003 is 614 nm. Like this, even when the wavelength of the first and second light is a wavelength in the near-infrared range, the third light 9003 has a wavelength in the visible range. Therefore, the wavelength conversion of the nonlinear optical crystal 103 allows an object to be picked up with visible light after the object is irradiated with near infrared light. Consequently, an image sensor having sensitivity to only the visible range may be used.

In a range in which the phase matching condition of the nonlinear optical crystal 103 is satisfied, any two of the wavelength of the first light 9001, the wavelength of the second light 9002, and the wavelength of the third light 9003 may be selected. For instance, the wavelength of light to be utilized may be selected freely according to the intensity of ambient light, the sensitivity of the image sensor, the luminous efficiency of the light source, and easiness of modulation.

The fourth optical system 107 has a function of forming an image from the third light 9003 in the image sensor 108. The fourth optical system 107 may include an optical component such as a lens. It is to be noted that the image sensor 108 may have sensitivity to the wavelength of the first light 9001 or the second light 9002. In that case, a light receiving element is blocked from the first light 9001 or the second light 9002 by using a spectroscopic element such as an optical filter or a spectrum prism, a diffraction grating.

As the image sensor 108, for instance, an organic image sensor and a silicon image sensor may be used. The image sensor 108 receives the third light 9003 and picks up an object. It is sufficient that the image sensor 108 have sensitivity to the wavelength of at least the third light 9003. It is desirable that the image sensor 108 substantially has no sensitivity to the wavelength of the first light 9001 which is irradiation light and the wavelength of the second light 9002.

The sensitivity to the wavelength of the first light 9001 and the second light 9002 may not be zero strictly. It is more desirable than the image sensor 108 has higher sensitivity to the wavelength of the third light 9003 than to the wavelength of the first light 9001 and the second light 9002. Signals based on the first light 9001 and second light 9002 may affect to an image pick-up signal as noise. Thus, it is sufficient that the intensities of the signals are within a range that has no effect on image pick-up and ranging. For example, the image sensor 108 may have sensitivity to the wavelength of the first light 9001 and the wavelength of the second light 9002, which is hundredth or less of sensitivity to the wavelength of the third light 9003.

The image sensor 108 does not need to have sensitivity to both of the first light 9011 and the second light 9002. In this case, the fourth optical system 107 does not have to be provided with a mechanism that removes the first light 9001 or the second light 9002, and thus the configuration of the fourth optical system 107 is simplified.

The image sensor 108 measures the intensity of the third light 9003. It is to be noted that the image pickup system 10A may be a non-integrated photodetector instead of the image sensor 108. In this case, the non-integrated photodetector measures the overall intensity of the third light 9003. In the present embodiment, a photodetector is exemplified as the image sensor 108 and the non-integrated photodetector.

An organic image sensor has a photoelectric conversion layer composed of organic materials such as phthalocyanine, P3HT, PCBM or C60, for example. The photoelectric conversion layer including such materials has sensitivity of approximately 650 nm at most on the long wave region. However, in this region, the photoelectric conversion layer has a higher photoelectric conversion efficiency compared with a silicon image sensor. When the wavelength of the first light 9001 is 1450 nm and the wavelength of the second light 9002 is 1064 nm, the organic image sensor does not have sensitivity to both light. Therefore, a mechanism that removes those light beams is unnecessary.

On the other hand, a silicon image sensor has sensitivity of approximately 1100 nm although the sensitivity is low. Therefore, in the instance of a combination of the wavelengths described above, when the third light 9003 is received by the image sensor 108, the second light 9002 is received as noise. For this reason, a mechanism that removes the second light 9002 may be provided in the fourth optical system 107.

The processor 110 ranges the distance to an object based on an image pick-up signal obtained by the image sensor 108. Specifically, the processor 110 measures the distance to the object based on the intensity of the third light 9003.

The controller 111 controls the entire TOF image pickup system 10A. The controller 111 is achieved by, for instance, a general-purpose computer (for instance, a personal computer) or a dedicated central processing unit (CPU) for a system.

The controller 111 is capable of controlling the phase of the modulation of each of the first light 9001 and the second light 9002. In other words, the controller 111 is capable of setting the phase of each of the first light source 101 and the second light source 102. In more specific description, the controller 111 is capable of setting at least two different phases to the first light source 101 as the phase of the modulation of the first light 9001. In addition, the controller 111 is capable of setting at least two different phases to the second light source 102 as the phase of the modulation of the second light 9002.

In this manner, the controller 111 is capable of setting at least two different phases to each of the light sources. The controller 111 may set plural phases so that the phase of each light source varies continuously. To switching the phase of the modulation of light continuously is in the range of the present disclosure. For specific application, the phase of the modulation of light may not be varied and the phase may be fixed in both light sources. The configuration will be described in detail later. Also, the controller 111 may set at least two different phases of the modulation to only one of the first light 9001 and the second light 9002 and may fix the phase of the modulation of the other light.

A measurement device may include the fourth optical system 107 and the image sensor 108. The measurement device determines a relative phase relationship between the phase of the modulation of the reflection light 9011 and the phase of the modulation of the second light 9002.

Alternatively, the processor 110 may determine the relative relationship in response to the output of the measurement device. The relative phase relationship is obtained according to the distance from the first light source 101 to the object 1001. The intensity of the third light 9003 may change according to the relative relationship. Therefore, it is possible to measure the distance to the object 1001 based on the intensity of the third light 9003.

Next, an example of the operation of the TOF image pickup system 10A will be described with reference to FIG. 3. Hereinafter, it is assumed that the phase of the modulation of the first light source 101 is fixed and the phase of the modulation of the second light source 102 is variable.

Figure 3:
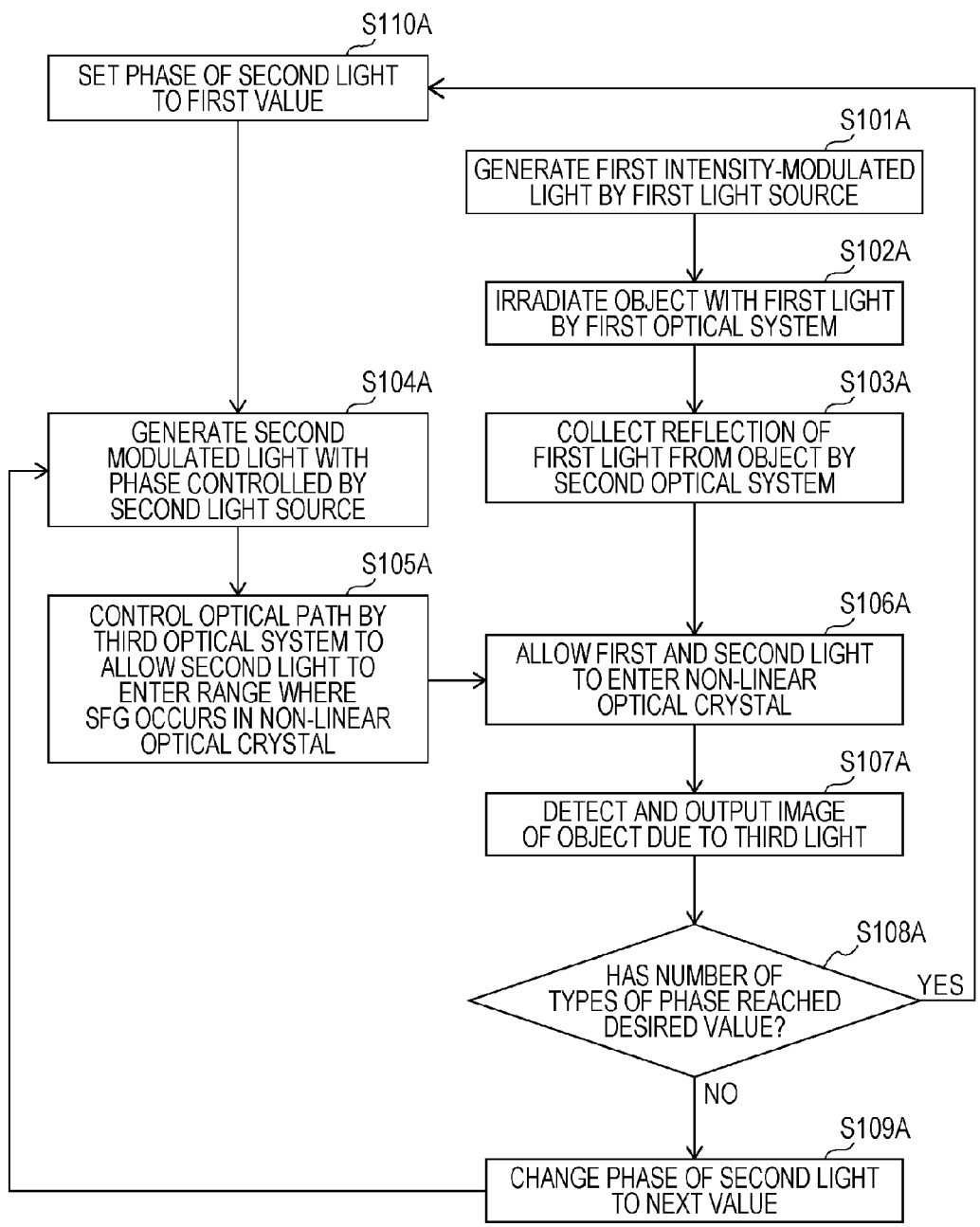
FIG. 3 is a flow chart illustrating the operation of the TOF image pickup system according to the exemplary first embodiment.

FIG. 3 illustrates an operation flow of the TOF image pickup system 10A. For instance, the controller 111 (see FIG. 1) performs each of the steps indicated below. Specifically, a computer program including a command corresponding to each step may be installed in a memory of the controller 111, and the controller 111 may call the computer program from the memory to execute the computer program sequentially to perform each step.

The first light source 101 generates the first light 9001 that is intensity modulated (step S101A). An object in an image pick-up area is irradiated with the first light 9001 using the first optical system 104 (step S102A). The reflection light 9011 from the object is focused using the second optical system 105 (step S103A).

On the other hand, the phase of modulation is set to a first value in the second light source 102 (step S110A) which generates the second light 9002 that is modulated. The modulation may be any one of the intensity modulation, the polarization modulation, and the wavelength modulation. For instance, the second light 9002 that is polarization modulated is generated (step S104A). The third optical system 106 controls the optical path of the second light 9002 so as to allow the second light 9002 to enter an area where SFG occurs in the nonlinear optical crystal 103 (step S105A).

The reflection light 9011 and the second light 9002 are allowed to enter the nonlinear optical crystal 103 to generate the third light 9003 (step S106A).

An image of the object formed by the third light 9003 is detected by the image sensor 108 and an image pick-up signal is outputted (step S107A).

The intensity of the third light 9003 depends on the relative relationship between the phase of the intensity modulation of the reflection wave 9011 and the phase of the modulation of the second light 9002. On the other hand, the phase of the intensity modulation of the reflection wave 9011 depends on the distance from the first light source 101 to the object 1001. The intensity of the third light 9003 includes information on the distance from the first light source 101 to the object 1001. Consequently, the information on the distance to the object 1001 is included in the image pick-up signal of the third light obtained by the image sensor 108. The distance information can be extracted by the processor 110.

However, the intensity of the third light 9003 also depends on the intensity of the reflection wave 9011 which is depends on the reflectance of the object 1001. The reflectance of the object 1001 may take various values according to the material quality, shape of the object. For this reason, the information on the distance to the object 1001 may not be sufficiently separated when the phase of the modulation of the second light 9002 is fixed at a single value.

Also, depending on the intensity modulated waveform of the first light 9011 and the modulated waveform of the second light 9002, an unmeasurable distance or a combination of distances difficult to be mutually identified may occur.

However, the reflectance of the object 1001 is independent on the value of the phase of the modulation of the second light 9002. Therefore, the intensity variation of the third light 9003 caused by variation of the value of the phase of the modulation of the second light 9002 is due to a change in the relative relationship between the phase of the intensity modulation of the reflection wave 9011 and the phase of the modulation of the second light 9002. Therefore, it is possible to separate the distance information by setting the phase of the modulation of the second light 9002 to plural values to pick up an image, the plural values being suitable for extraction of the distance information.

Even when measurement is difficult with a certain value of the phase of the modulation of the second light 9002, the measurement may be made by changing the phase of the modulation of the second light 9002 to another value.

Because of the reason mentioned above, even if sufficient distance information is not available with a certain value of the phase of the modulation of the second light 9002, the measurement may be made by changing the phase of the modulation of the second light 9002 to another value. The number of set values for the phase of the modulation of the second light 9002 may be determined by the modulated waveform and the type of object, the accuracy of distance information needed.

When measurement is performed with plural set values of the phase of modulation, the necessary number of set values of the phase of modulation is preset and it is determined whether or not the number of set values used for measurement reaches the necessary value (step S108A). When the necessary value is reached, the set value of the phase of modulation is initialized to the first value, and measurement is repeated from step S110A.

When a necessary value is not reached, the set value of the phase of modulation is changed to the next set value (S109), and measurement is repeated from step S104A.

The controller 111 repeatedly performs steps 101A to 110A described above until a predetermined condition is satisfied. The obtained image pick-up signal includes information indicating variation of the intensity of the third light, and the information includes the distance information on the object.

The steps described above allow the information on the distance to the object to be extracted by the processor 110. Also, the processor 110 may perform image analysis such as object recognition based on the obtained image pick-up signal.

According to the present embodiment, TOF image pick-up is made possible by using a certain light as irradiation light, the certain light having a wavelength to which the image sensor 108 has no sensitivity. Also, the object is detectable simultaneously with ranging of the object.

Second Embodiment

A TOF image pickup system 10B that uses pulsed light as irradiation light will be described with reference to FIGS. 4 to 7D.

Figure 4:
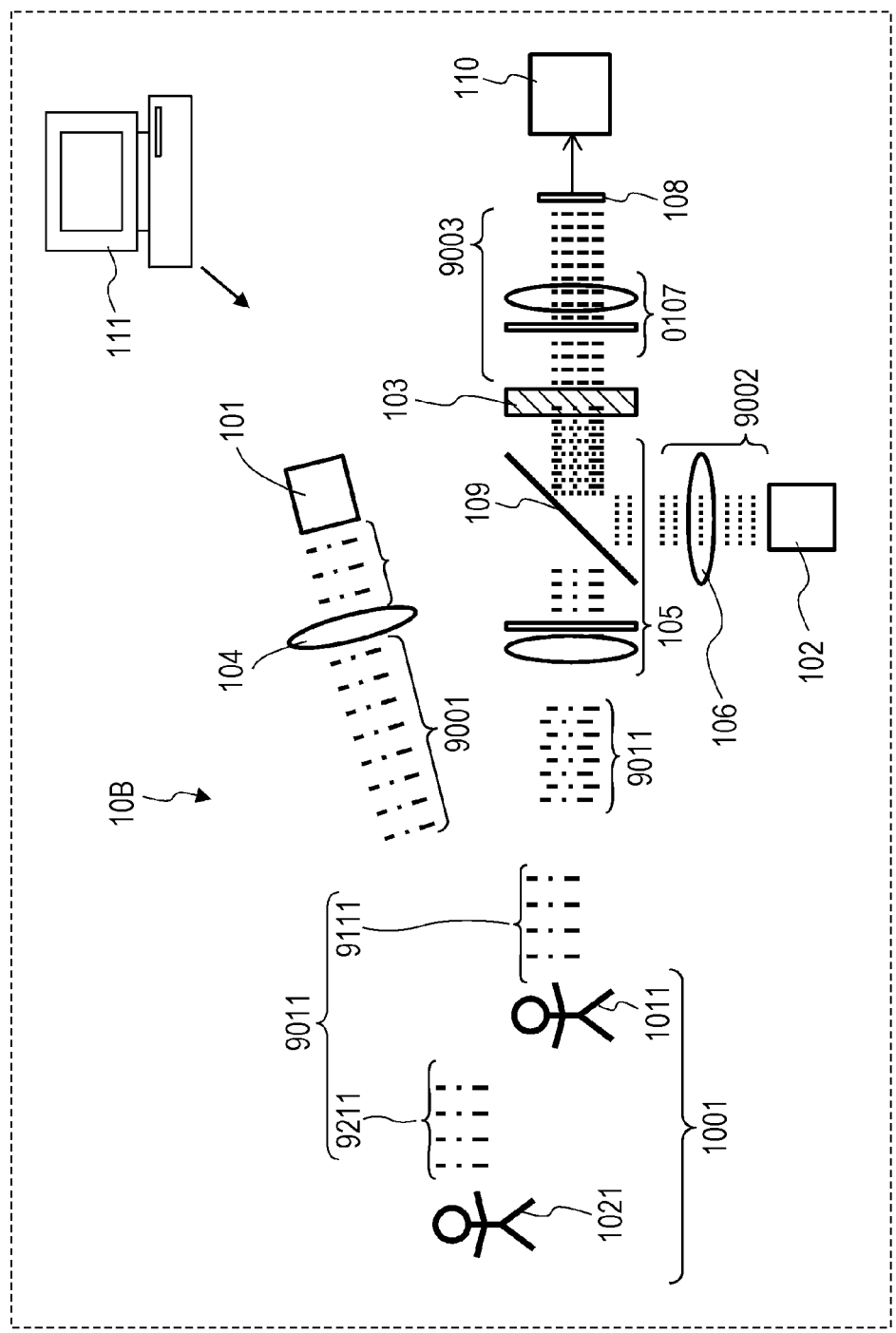
FIG. 4 is a schematic diagram of TOF image pickup system according to an exemplary second embodiment.

FIG. 4 schematically illustrates the configuration of the TOF image pickup system 10B according to the present embodiment. Hereinafter, different points from the first embodiment will be mainly described and detailed description of similar points is omitted.

The first light source 101 generates the first intensity-modulated light 9001. The first light 9001 is treated as a train of impulses with a narrow pulse width that are emitted with a certain period.

As described in the first embodiment, the wavelength of the first light 9001 may be selected freely. In the present embodiment, light with a wavelength of 1450 nm is utilized. The wavelength belongs to the sunlight lacking wavelength band and is an eye safe wavelength with which an image is not formed on the retina.

The object 1001 is irradiated with the first light 9001 using the first optical system 0104. The object 1001 includes objects 1021 and 1011 that are located at different distances. The object 1001 is irradiated with the first intensity-modulated light 9001. At this point, reflection occurs on the object 1001 and part of the first light 9001, that is, (reflection light) 9011 is transmitted to the second optical system 105. The reflection light 9011 is allowed to enter the nonlinear optical crystal 103 using the second optical system 105. The reflection light 9011 includes light 9211 and 9111 that are reflected from the objects 1021 and 1011, respectively.

Figure 5A:
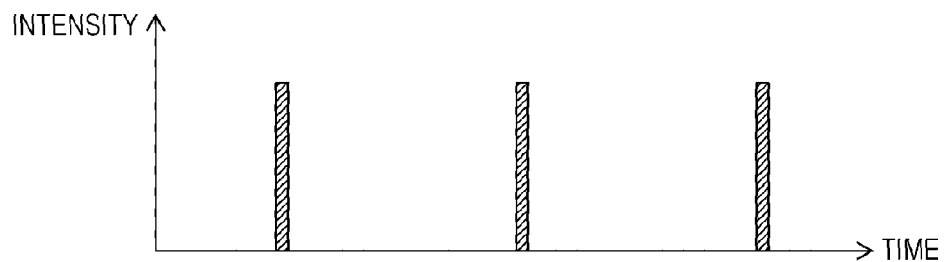
FIG. 5A is a graph illustrating the intensity of first light.
Figure 5B:
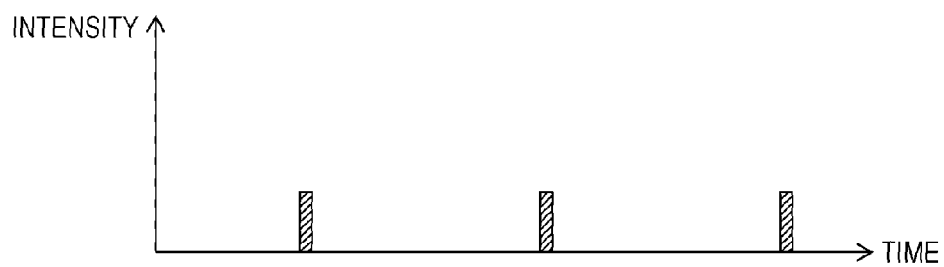
FIG. 5B is a graph illustrating the intensity of reflection light.
Figure 5C:
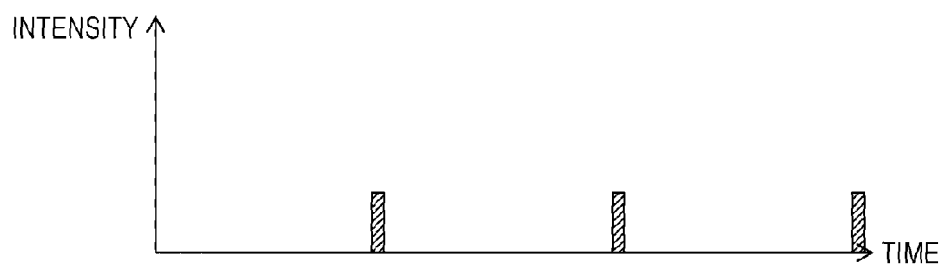
FIG. 5C is a graph illustrating the intensity of reflection light.

FIG. 5A illustrates the intensity of the first light 9001. FIG. 5B illustrates the intensity of the reflection light 9111. FIG. 5C illustrates the intensity of the reflection light 9211. The time when the reflection light enters the nonlinear optical crystal 103 varies according to the distance to the object. The light 9111 reflected from the near object 1011 enters the nonlinear optical crystal 103 early. The light 9211 reflected from the far object 1021 enters the nonlinear optical crystal 103 late. That is, a phase difference according the distance to the object occurs in the reflection light 9011.

The second light source 102 generates the second modulated light 9002. The modulation may be any one of the intensity modulation, the polarization modulation, and the wavelength modulation. In the present embodiment, the modulation of the second light 9002 will be described by giving an example of intensity modulation. The intensity modulation may be pulsed or continuous. Hereinafter, the modulation is pulse modulation and it is assumed that the period and pulse width are the same as those of the first light 9001. The period of the modulation of the second light 9002 may be substantially equal to that of the first light 9001. For example, the period of the modulation of the second light 9002 may be the same as that of the first light 9001 so that a measured error is within a permissible range. As described in relation to the selection of wavelength in the first embodiment, light of 1064 nm wavelength is utilized as the second light 9002 in the present embodiment.

With the phase of modulation of the second light 9002 fixed to a certain value, the second light 9002 is allowed to enter the nonlinear optical crystal 103 using the third optical system 106. At this point, the second light 9002 is allowed to enter so that its optical path is superimposed on the optical paths of the reflection light 9111 and 9211 from the objects 1011 and 1021. The reflection light 9111, the reflection light 9211, and the second light 9002 enter the nonlinear optical crystal 103. At this point, in the case where the phases of modulation of the reflection light 9111 or the reflection light 9211 and the second light pulse 9002 are matched, both pulses are completely superimposed on each other. Consequently, SFG phenomenon occurs in the nonlinear optical crystal 103, and the third light 9003 is generated.

On the other hand, in the case where the phases of modulation of the reflection light 9111 or the reflection light 9211 and the second light pulse 9002 are not matched, both pulses are not completely superimposed. Consequently, no SFG phenomenon occurs in the nonlinear optical crystal 103, and the third light 9003 is not generated.

Figure 6A:
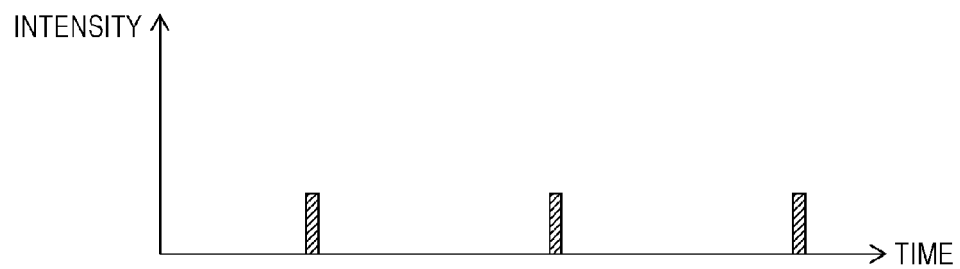
FIG. 6A is a graph illustrating the intensity of the reflection light.
Figure 6B:
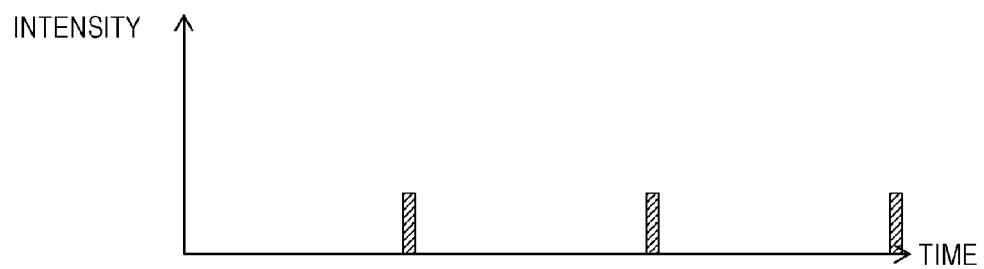
FIG. 6B is a graph illustrating the intensity of the reflection light.
Figure 6C:
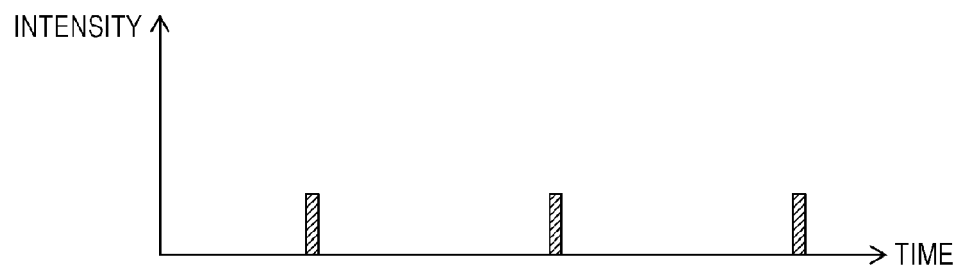
FIG. 6C is a graph illustrating the intensity of second light in a first phase.
Figure 6D:
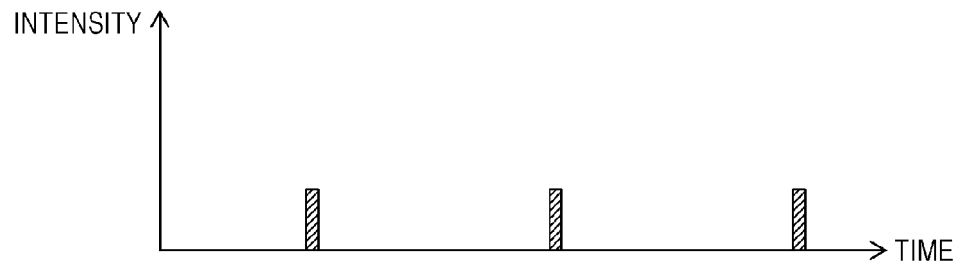
FIG. 6D is a graph illustrating the intensity of third light.

FIG. 6A illustrates the intensity of the reflection light 9111. FIG. 6B illustrates the intensity of the reflection light 9211. FIG. 6C illustrates the intensity of the second light 9002 in the first phase. FIG. 6D illustrates the intensity of the third light 9003.

Only a group of pulses of the first light 9001 that is reflected by an object in a specific distance is matched with pulses of the second light 9002 having the first phase, for instance. Thus, an image from the third light 9003 is formed in the image sensor 108 using the fourth optical system 0107, and when the image is picked up by the image sensor 108, an image of the object with matched phase of modulation and a specific distance is obtainable. In the example illustrated, the phase of the modulation of the reflection light 9111 from the near object 1011 is matched with the first phase of the second light, and the third light 9003 is generated. Only the image of the near object 1011 is obtainable and the image of the far object 1021 is not obtained. When the phase of the modulation of the second light 9002 is changed, the reflection light from an object in a different distance is matched with the phase of the modulation of the second light 9002, and thus the image of the object in the distance is obtainable.

Figure 7A:
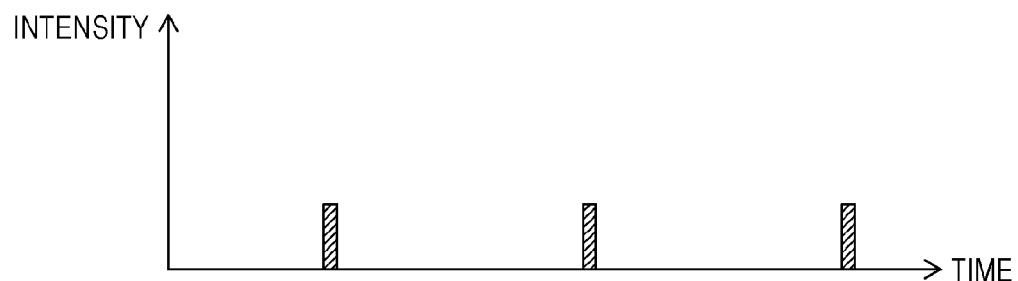
FIG. 7A is a graph illustrating the intensity of the reflection light.
Figure 7B:
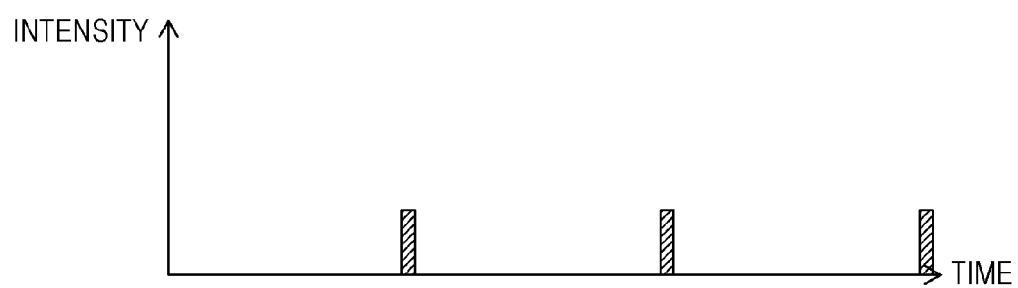
FIG. 7B is a graph illustrating the intensity of the reflection light.
Figure 7C:
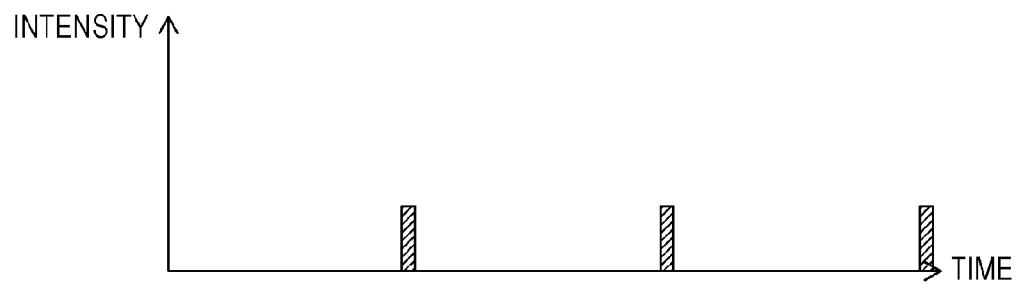
FIG. 7C is a graph illustrating the intensity of the second light in a second phase different from the first phase.
Figure 7D:
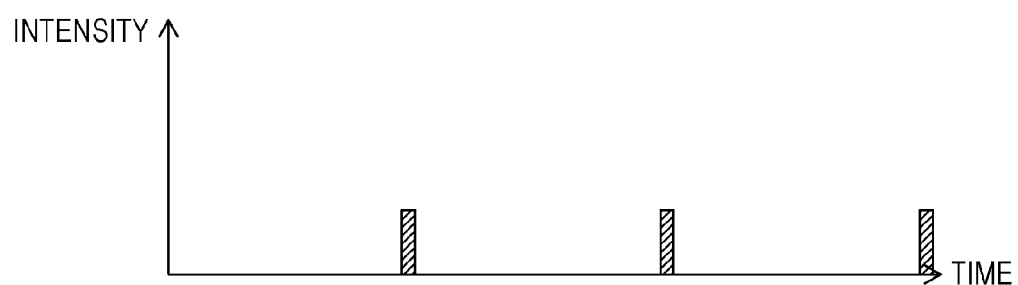
FIG. 7D is a graph illustrating the intensity of the third light.

FIG. 7A illustrates the intensity of the reflection light 9111. FIG. 7B illustrates the intensity of the reflection light 9211. FIG. 7C illustrates the intensity of the second light 9002 in a second phase which is different from the first phase. FIG. 7D illustrates the intensity of the third light 9003.

In the example illustrated, the phase of the modulation of the reflection light 9211 from the far object 1021 is matched with the second phase, and the third light is generated. Only the image of the far object 1021 is obtainable and the image of the near object 1011 is not obtained. In this manner, the phase of the modulation of the second light 9002 is changed for just the number of distances for image pick-up, and thus image pick-up (TOF image pick-up) using the TOF system is achieved.

As described in the first embodiment, when the modulation of the first light 9001 and the second light 9002 is not pulse modulation, the third light 9003 may be generated all the time. However, even in this case, the intensity of the third light 9003 changes according to the phase relationship between the modulations of the reflection light 9011 of the first light and the second light 9002. Thus, the TOF image pick-up is achievable by measuring the intensity variation of the third light 9003 when the phase of the modulation of the second light 9002 is changed.

The wavelength of the third light 9003 is given by Expression 2 as described above. When the wavelength of the first light 9001 is 1450 nm and the wavelength of the second light 9002 is 1064 nm, the wavelength of the third light 9003 is 614 nm. When the wavelength is 614 nm, highly sensitive pick-up is achievable using a silicon-image sensor or an organic image sensor. The wavelength of 1450 nm of the first light 9001 belongs to the sunlight lacking wavelength band. Therefore, TOF image pick-up using a highly sensitive sensor is achievable while reducing the adverse effect of the ambient light.

In this manner, according to the present disclosure, the TOF image pick-up may be performed on an object which is irradiated with light having a certain wavelength, using an image sensor having extremely low sensitivity to the wavelength.

For normal TOF image pick-up, an image sensor itself has to be provided with a function of detecting a phase difference. Therefore, an operation speed of approximately several hundreds MHz is needed. According to the present disclosure, when pulsed light is used, the image sensor 108 is capable of detecting a phase difference by identifying whether or not the third light 9003 has been detected. When continuous light is used, is capable of detecting a phase difference by measuring the intensity variation of the light. For this reason, it is sufficient that the image sensor 108 have an operation speed responsive to a time period in which the phase of the second light 9002 is switched, that, is a time period in which an image pick-up distance is switched. For instance, when the positional relationship between an object and the image pickup system is fixed, the time period may be increased without limit in principle. Thus, the operation speed of the image sensor does not matter in principle.

For application such as in-vehicle monitoring in which a relative motion with respect to an object may occur, a certain degree of time resolution is needed. Therefore, a time taken to switch between phases is limited. However, according to the present embodiment, for instance, when 100 sets of 100 types of distance information is designed to be obtained per second, 0.1 millisecond is ensured for measurement in each phase. This indicates that several tens kHz is sufficient for the operation speed of an image sensor. The operation speed of the organic image sensor is low compared with that of the silicon image sensor. However, the above-mentioned operation speed is achievable even with an organic image sensor.

The image sensor 108 itself does not have to be provided with a complicated circuit for phase detection. Thus, it is possible to utilize an image sensor that uses a compound semiconductor in which it is difficult to integrate complicated circuits.

It is apparent that the present disclosure is applicable to a range gate camera. The interval for opening a gate is controllable by the pulse width of the second light 9002. For instance, at present, a light source (for instance, a femtosecond laser) is known that emits light with a narrow pulse width up to femtosecond. A practically sufficiently narrow gate width is achievable using the light source When the image sensor 108 in the present embodiment is replaced by a non-integrated photodetector, the image pickup system 10B in the present embodiment may function as a lidar. In this case, the image pick-up device described in the first embodiment functions as a measurement device. When spatial resolution is not needed, the present embodiment may be implemented without using the spatial resolution. When a scanning mechanism is desired to be utilized, the mechanism may be incorporated in the present embodiment.

Next, an example of the operation of the TOF image pickup system 10B will be described with reference to FIG. 8.

FIG. 8 illustrates an operation flow of the TOF image pickup system 10B. For instance, the controller 111 (see FIG. 4) that controls the entire TOF image pickup system 10B performs each of the steps indicated below. Specifically, a computer program including a command corresponding to each step may be installed in a memory of the controller 111, and the controller 111 may read the computer program from the memory to execute the computer program sequentially to perform each step.

The first light source 101 generates the first light 9001 that is intensity modulated (step S101B). An object in an image pick-up area is irradiated with the first light 9001 using the first optical system 104 (step S102B). The reflection light 9011 from the object is focused using the second optical system 105 (step S103B).

On the other hand, the phase of modulation is set to a value corresponding to the first measurement distance in the second light source 102 (step S110B) which generates the second light 9002 that is modulated. The modulation may be any one of the intensity modulation, the polarization modulation, and the wavelength modulation. For instance, the second light 9002 that is polarization modulated is generated (step S104B). The third optical system 106 controls the optical path of the second light 9002 so as to allow the second light 9002 to enter an area where SFG occurs in the nonlinear optical crystal 103 (step S105B).

The reflection light 9011 and the second light 9002 are allowed to enter the nonlinear optical crystal 103 to generate the third light 9003 (step S106B).

An image of the object carried by the third light 9003 is detected by the image sensor 108 and an image pick-up signal is outputted (step S107B).

The intensity of the third light 9003 depends on the relative relationship between the phase of the intensity modulation of the reflection wave 9011 and the phase of the modulation of the second light 9002. Because the modulation of the first light 9001 and the modulation of the second light 9002 are both pulsed, the third light 9003 is generated only from the reflection light 9011 from the object 1001 that has a specific distance relationship according to the value of the phase of the modulation of the second light 9002.

The difference in reflectance of the object 1001 has an effect on the strength of the third light 9003, but has not effect on the distance information. For this reason, when the modulation of the first light 9001 and the modulation of the second light 9002 are both pulsed, only detection of the image of the object from the third light 9003 allows the distance information to be extracted.

However, in this method, for a certain value of the phase of the modulation of the second light 9002, only the image of an object in a specific distance may be picked up. Thus, when the distance to an object in a measurement range with a certain width is desired to be measured, the phase of the modulation of the second light 9002 has to be changed to plural values and the object is successively picked up for each value. The number of set values for the phase of the modulation of the second light 9002 is the same as the number of distances to be measured and may be determined based on a distance measurement range, a distance measurement accuracy, and others.

When the phase of modulation is measured with plural set values, the number of needed values for the phase of modulation is preset and it is determined whether or not the number of values used for measured phase reaches a desired value (step S108B). When the desired value is not reached, the value of the phase of the modulation of the second light 9002 is changed to a value that corresponds to the next measurement distance (step S109B). Then measurement is repeated from step S104B. When the desired value is reached, the phase of the modulation of the second light 9002 is initialized to a value corresponding to the first measurement distance, and measurement is repeated from step S110B.

The controller 111 repeatedly performs steps 101B to 110B described above until a predetermined condition is satisfied. The obtained image pick-up signal includes information indicating variation of the intensity of the third light, and the information includes the distance information on the object.

The steps described above allow the information on the distance to the object to be extracted by the processor 110.

Also, the processor 110 may perform image analysis such as object recognition based on the obtained image pick-up signal.

According to the present embodiment, TOF image pick-up is made possible by using a certain light as irradiation light, the certain light having a wavelength to which the image sensor 108 has no sensitivity. Also, the image of an object is detectable simultaneously with ranging of the object.

Third Embodiment

An image pickup system 10C according to the present embodiment will be described with reference to FIGS. 9 to 12E. The image pickup system 10C has substantially the same configuration as that of the image pickup system 10A according to the first embodiment. In the present embodiment, efficient functioning of the image pickup system 10C in image pick-up in bad weather such as fog will be described.

Figure 9:
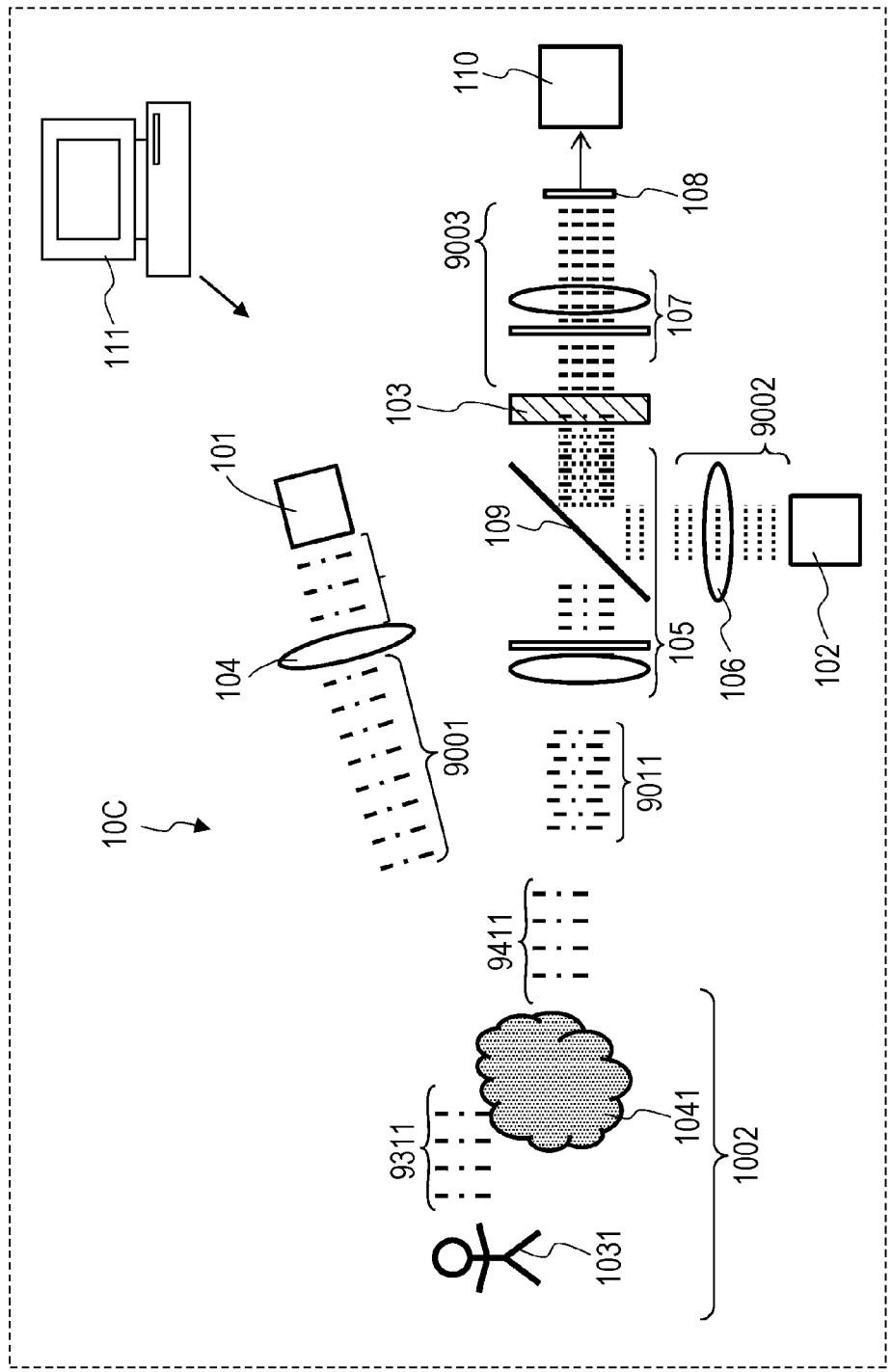
FIG. 9 is a schematic diagram of image pickup system according to an exemplary third embodiment.

FIG. 9 schematically illustrates the configuration of the image pickup system 10C according to the present embodiment. As illustrated, the object 1002 includes a fog 1041. The reflection light 9011 from the object 1002 includes reflection light 9311 from an object 1031 and reflection light 9411 from the fog. Hereinafter, it is assumed that the modulation of the second light 9002 is polarization modulation.

Figure 10A:
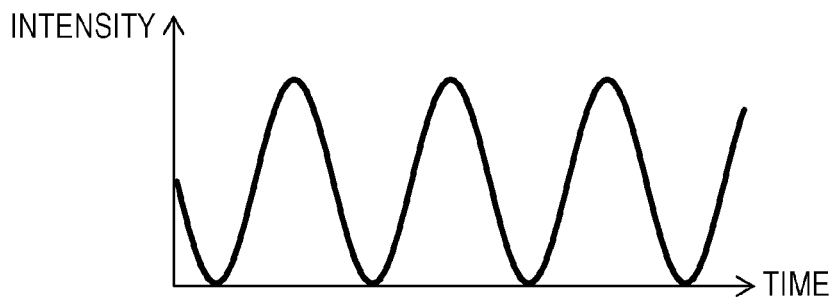
FIG. 10A is a graph illustrating the intensity of the first light.
Figure 10B:
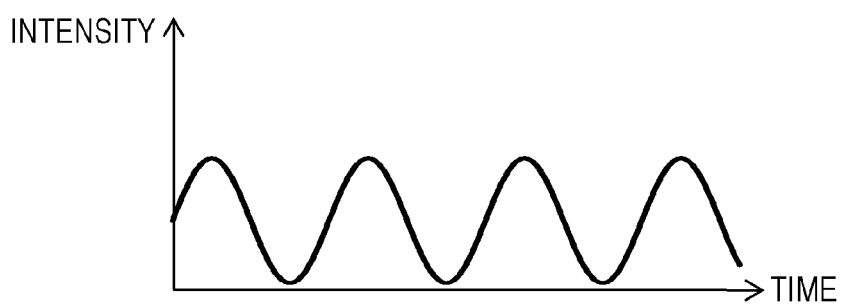
FIG. 10B is a graph illustrating the intensity of reflection light from an object.
Figure 10C:
FIG. 10C is a graph illustrating the intensity of reflection light from fog.

FIG. 10A illustrates the intensity of the first light 9001. FIG. 10B illustrates the intensity of the reflection light 9311 from the object. FIG. 10C illustrates the intensity of the reflection light 9411 from the fog.

The first light source 101 emits the first intensity-modulated light 9001. The modulation may be pulsed or continuous. In the present embodiment, continuous modulation is applied to the first light 9001. The continuous modulation is easier to be implemented than the pulse modulation. As described above, the wavelength of the first light 9001 may be selected freely. In the present embodiment, light with a wavelength of 1550 nm is utilized. It is to be noted that in order reduce the effect of scattering of light due to fog, it is advantageous to use a long wavelength as much as possible. The frequency of the modulation may be 10 GHz, for instance. Modulation at this speed is also sufficiently possible with a modulator that uses an electro optic element.

The object 1002 is irradiated with the first light 9001 by the first optical system 104. The object 1002 is irradiated with the first intensity-modulated light 9001. At this point, the first light 9001 is reflected by the object 1031 such as a pedestrian, an obstacle, and a vehicle and the fog 1041. Part of the reflection light 9311 from the object 1031 and part of the reflection light 9411 from the fog 1041 are transmitted to the second optical system 105. The reflection light 9311 and 9411 enter the nonlinear optical crystal 103 through the second optical system 105. It is to be noted that in the present embodiment, the second optical system 105 includes a polarizer. The polarizer allows only light in a specific polarization state to enter the nonlinear optical crystal 103.

As illustrated in FIG. 10B, the reflection light 9311 from the object 1031 enters the nonlinear optical crystal 103 while the modulated waveform of the original light (the first light 9001) is maintained in a time scale of approximately 10 GHz.

On the other hand, as illustrated in FIG. 10C, the reflection light 9411 from the fog 1041 does not have the original modulated waveform because the fog 1041 is distributed continuously in space and causes multiple scattering of light. Therefore, the reflection light 9411 is deficient in a high frequency component and enters the nonlinear optical crystal 103 in an equalized state. For instance, the reflection light 9411 from the fog 9411 which is distributed in a range of 10 m has a variation of approximately 10 nanoseconds. Consequently, original modulation information in 10 GHz is mostly missing.

The second light source 102 emits the second modulated light 9002. The modulation may be any one of the intensity modulation, the polarization modulation, and the wavelength modulation. In the present embodiment, the second light 9002 is polarization-modulated. Light of 1064 nm wavelength is utilized as the second light 9002. The period of the polarization modulation of the second light 9002 is the same as the period of the intensity modulation of the first light 9001. This is because the same period of modulation makes information processing simple. However, the period of the modulation of the first light 9001 and the period of the modulation of the second light 9001 may not be the same. For instance, a multiple of the period of the modulation of the first light 9001 may be the same as a multiple of the period of the modulation of the second light 9002. Such a case is substantially equivalent to the case where the first light 9001 and the second light 9002 are modulated with a cyclic period of the least common multiple of the periods of both modulation.

First, the phase of the modulation of the second light 9002 is fixed to a certain value (for instance, the first phase). The optical path of the second light 9002 is adjusted by the third optical system 106 so that the second light 9002 enters the nonlinear optical crystal 103 in a state where the optical path of the second light 9002 and the optical paths of the reflection light 9311 and the reflection light 9411 are superimposed on each other.

The reflection light 9311, the reflection light 9411, and the second light 9002 enter the nonlinear optical crystal 103. SFG occurs in the nonlinear optical crystal 103 only when the reflection light 9311 or the reflection light 9411 and the second light 9002 enter simultaneously and the phase matching condition is satisfied.

Figure 11A:
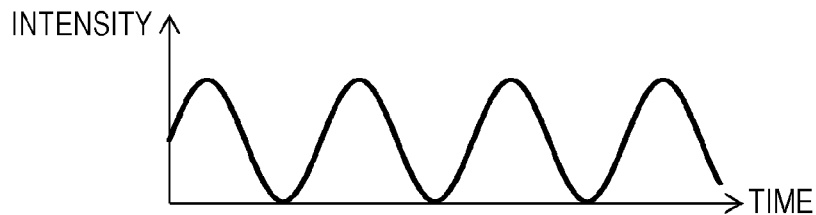
FIG. 11A is a graph illustrating the intensity of the reflection light.
Figure 11B:
FIG. 11B is a graph illustrating the intensity of reflection light.
Figure 11C:
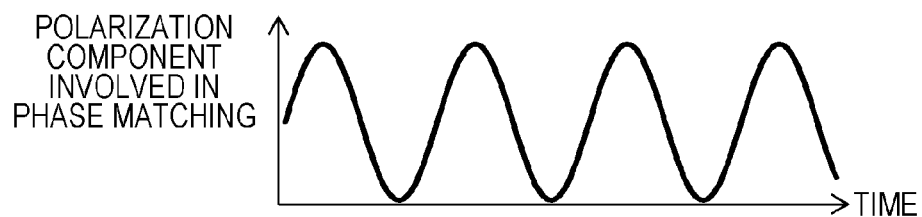
FIG. 11C is a graph illustrating the polarization component (intensity) that is of the second light and involved in phase matching when the phase of the second light is the first phase.
Figure 11D:
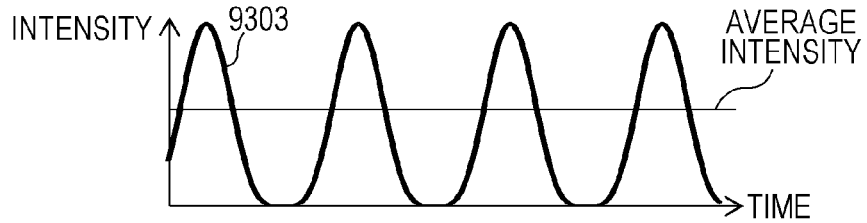
FIG. 11D is a graph illustrating the intensity of third light that is generated from the reflection light and the second light.
Figure 11E:
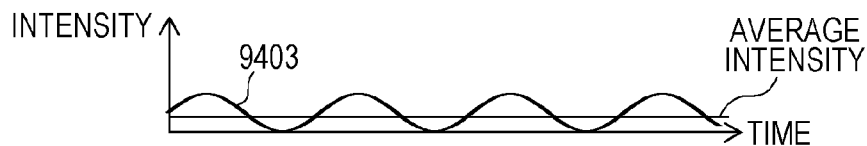
FIG. 11E is a graph illustrating the intensity of third light generated from the reflection light and the second light.

FIG. 11A illustrates the intensity of the reflection light 9311. FIG. 11B illustrates the intensity of the reflection light 9411. FIG. 11C illustrates the intensity of the polarization component that is of the second light 9002 and involved in phase matching when the phase of the second light 9002 is the first phase. FIG. 11D illustrates the intensity of third light 9303 that is generated from the reflection light 9311 and the second light 9002. FIG. 11E illustrates the intensity of third light 9403 generated from the reflection light 9411 and the second light 9002.

As illustrated, the third light 9303 is generated based on the reflection light 9311 and light of the polarization component that is of the second light 9002 and involved in phase matching. Also, the third light 9403 is generated based on the reflection light 9411 and light of the polarization component that is of the second light 9002 and involved in phase matching.

The phase matching condition depends on the polarization states of two entered light. When the first light 9001 is linearly polarized, only the polarization component of the second light 9002 in a specific polarization direction satisfies the phase matching condition. Therefore, when the second light 9002 is polarization-modulated even with a fixed intensity of the second light 9002, the intensity of the third light 9003 is modulated as a consequence. In this manner, modulation of the polarization component that is of the second light 9002 and satisfies the phase matching condition plays the same role as the intensity modulation.

The first phase is the phase of the modulation of the second light 9002 when the ridge of the modulated waveform of the reflection light 9311 from the object 1031 and the ridge of the modulated waveform of the second light 9002 are superimposed on each other. When the phase of the modulation of the second light 9002 is set to the first phase, the third light 9303 occurs with the highest intensity. The time average intensity of the third light 9303 has a maximum. On the other hand, the third light 9303 occurs with the lowest intensity when the phase of the modulation of the second light 9002 is set so that the ridge of the modulated waveform of the reflection light 9311 from the object 1031 and the valley of the modulated waveform of the second light 9002 are superimposed on each other. The time average intensity of the third light 9303 has a minimum.

Figure 12A:
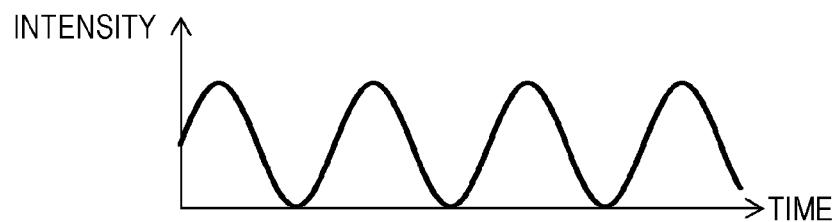
FIG. 12A is a graph illustrating the intensity of the reflection light.
Figure 12B:
FIG. 12B is a graph illustrating the intensity of the reflection light.
Figure 12C:
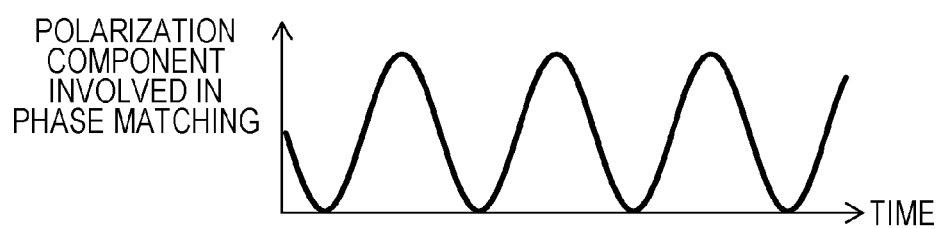
FIG. 12C is a graph illustrating the polarization component (intensity) that is of the second light and involved in phase matching when the phase of the second light is the second phase different from the first phase.
Figure 12D:
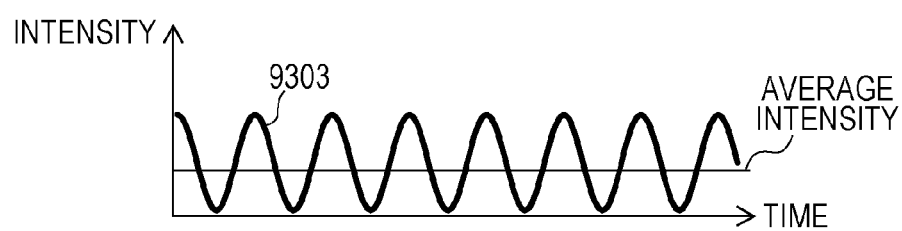
FIG. 12D is a graph illustrating the intensity of the third light generated from the reflection light and the second light.
Figure 12E:
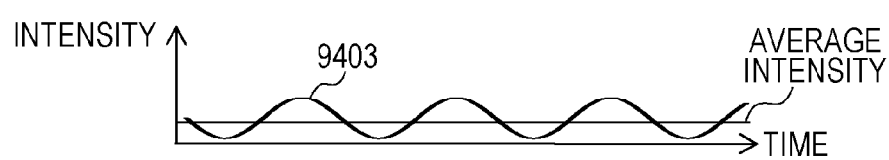
FIG. 12E is a graph illustrating the intensity of the third light generated from the reflection light and the second light.

FIG. 12A illustrates the intensity of the reflection light 9311. FIG. 12B illustrates the intensity of the reflection light 9411. FIG. 12C illustrates the polarization component (intensity) that is of the second light 9002 and involved in phase matching when the phase of the second light 9002 is the second phase different from the first phase. FIG. 12D illustrates the intensity of the third light 9303 generated from the reflection light 9311 and the second light 9002. FIG. 12E illustrates the intensity of the third light 9403 generated from the reflection light 9411 and the second light 9002.

The intensity of the third light 9303 illustrated in FIG. 12D is lower than the intensity of the third light 9303 illustrated in FIG. 11D.

It depends on the distance to an object whether the reflection light 9011 and the second light 9002 have a phase relationship for mutual increase, a phase relationship for mutual decrease, or a phase relationship for between mutual increase and decrease. On the other hand, when the phase of the second light 9002 is changed, the phase relationship between the both changes. In this case, the time average intensity of the third light 9303 caused by the reflection light 9011 from the object changes regardless of the distance of the object.

The reflection light 9411 from the fog is deficient in a modulation component. Therefore, even when the phase of the second light 9002 is changed, the time average intensity of the third light 9403 caused by the reflection light 9411 does not change. The intensity of the third light 9403 illustrated in FIG. 12E is substantially the same as the intensity of the third light 9403 illustrated in FIG. 11E. The time average intensity is also substantially the same between the both.

The image sensor 108 is typically an accumulation type detector. The image sensor 108 outputs a total quantity (accumulated value of light quantity) of the light that enters during an exposure time. Therefore, an image pick-up result equivalent to the time average intensity is obtainable by increasing the exposure time longer than the period of the modulation of the second light without performing additional processing. In this situation, an additional equalization circuit is unnecessary. For instance, for the modulation of 10 GHz, the period is 0.5 nanosecond. For an exposure of 5 nanoseconds, an average value for ten periods is acquirable.

Thus, the exposure time may be increased without limit in principle. Noise is reduced as the time interval (the number of accumulation times) over which an average is calculated is increased, and thus the accuracy of ranging is improved. However, in practical use, it is desirable that the exposure time be such that a relative position with respect to the object does not change. For instance, in the case of an automobile that runs at 100 km/h, the automobile moves only 2.8 mm for 0.1 millisecond. That is, even when the image pickup system according to the present disclosure is mounted on an automobile that runs at 100 km/h, the relative distance to the object changes only several millimeters per 0.1 millisecond. The change is negligible. Therefore, it does not matter even when measurement of one phase takes 0.1 millisecond. This indicates that sufficient effects are obtainable even when an image sensor operative at a low speed such as an organic image sensor is used.

When the phase of the modulation of the second light 9002 is the first phase, the image sensor 108 obtains a first image signal including the object 1031 and the fog 1041 illustrated in FIG. 9. In addition, when the phase of the modulation of the second light 9002 is the second phase which is different from the first phase, the image sensor 108 obtains a second image signal including the object 1031 and the fog 1041. The first image signal and the second image signal both include the object 1031 and the fog 1041. However, the image signal of the fog 1041 is independent of the phase of the modulation and does not change although the image signal intensity of the object 1031 is dependent on the phase of the modulation and changes. Therefore, the difference between those image signals is determined, and the image signal based on the fog is thereby removed. In this manner, an adverse effect of multiple scattering of light due to a fog may be reduced and a difference image in which the reflection light from the object is enhanced may be obtained.

Figure 13:
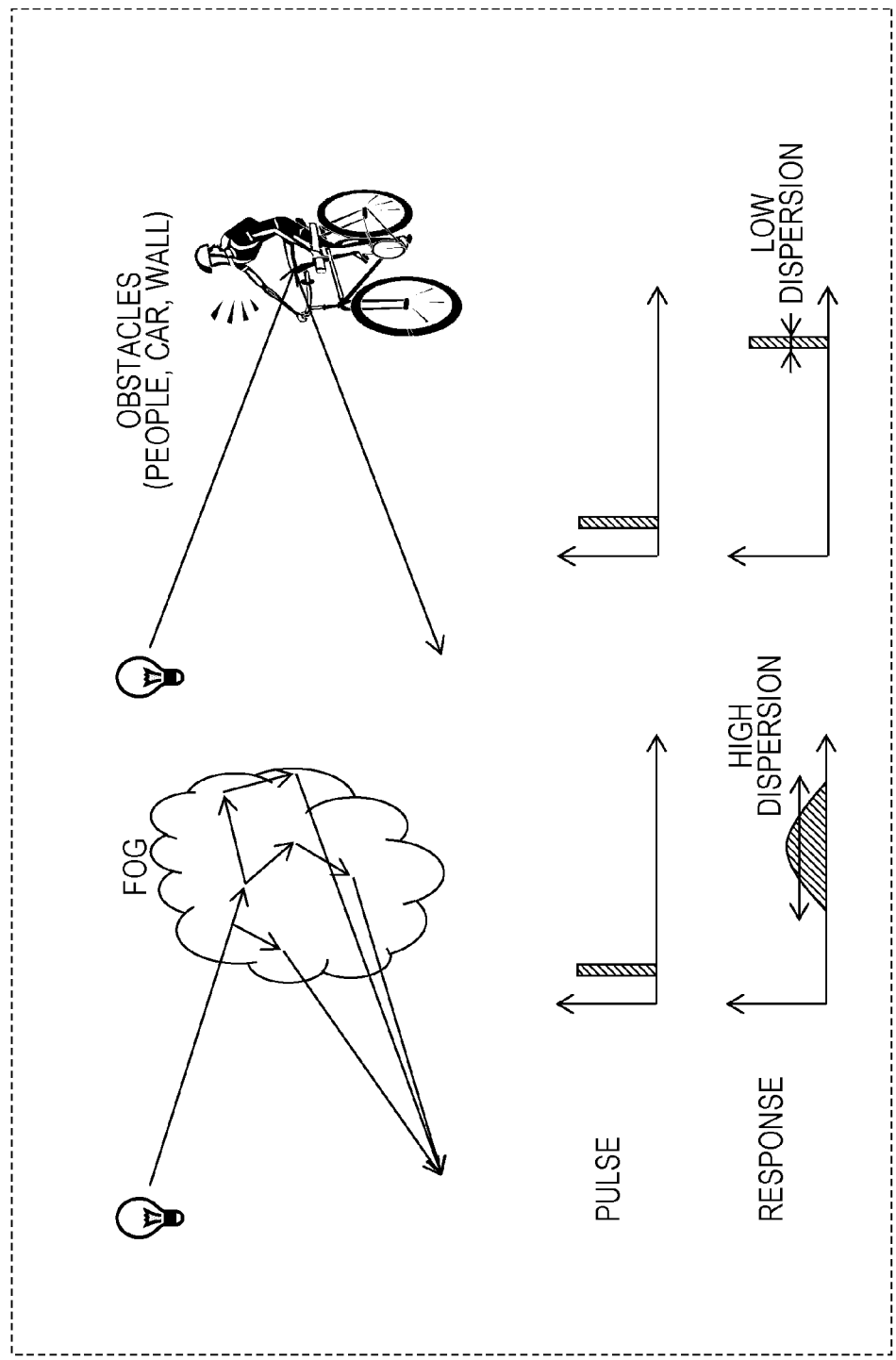
FIG. 13 is an illustration schematically depicting multiple scattering of light due to fog.

FIG. 13 schematically illustrates multiple scattering of light due to the fog 1041. When the first and second light is pulsed light, the variance (time variance) of the pulse width of the third light 9003 based on the reflection light 9311 from the object is small. On the other hand, the time variance of the third light 9003 based on the reflection light 9411 from the fog is large because of the effect of multiple scattering due to the fog 1041. The image sensor 108 may have a function of measuring the time variance of the third light. The fog and the object may be clearly distinguished by comparing between time variances of returned light beams. In this case, the time resolution for distinguishing between variances of approximately several tens ps is needed.

According to the present embodiment, an object (for example, a pedestrian, a vehicle coming in the opposite direction, or an obstacle) in a fog is detectable with high accuracy.

Next, an example of the operation of image pickup system 10C will be described with reference to FIG. 14.

Figure 14:
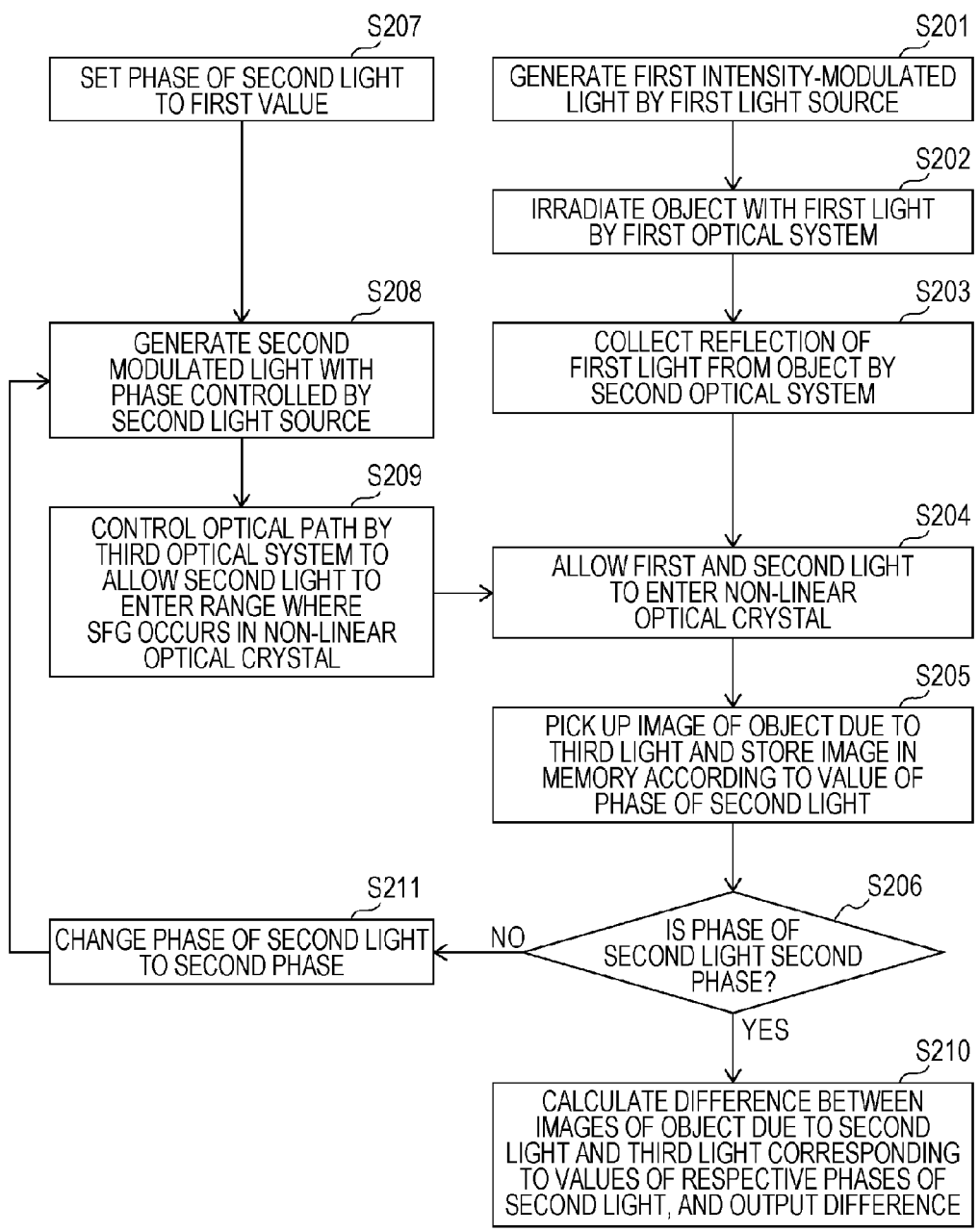
FIG. 14 is a flow chart illustrating the operation of the image pickup system according to the exemplary third embodiment.

FIG. 14 illustrates an operation flow of the image pickup system 10C. For instance, the controller 111 (see FIG. 9) that controls the entire image pickup system 10C performs each of the steps indicated below. Specifically, a computer program including a command corresponding to each step may be installed in a memory of the controller 111, and the controller 111 may call the computer program from the memory to execute the computer program sequentially to perform each step.

The first light source 101 generates the first light 9001 that is intensity modulated (step S201). An object in an image pick-up area is irradiated with the first light 9001 using the first optical system 104 (step S202). The reflection light 9011 from the object is focused using the second optical system 105 (step S203).

On the other hand, the phase of the modulation of the second light 9002 is set to the first phase (step S207). The second light source 102 controls the phase and generates the second modulated light 9002 (step S208). The third optical system 106 controls the optical path of the second light 9002 so as to allow the second light 9002 to enter an area where SFG occurs in the nonlinear optical crystal 103 (step S209).

The reflection light 9011 and the second light 9002 are allowed to enter the nonlinear optical crystal 103 to generate the third light 9003 (step S204).

The image sensor 108 picks up an object based on the third light 9003. The image sensor 108 obtains an accumulated value of the above-mentioned group of pulses for 0.1 millisecond, for instance. An obtained image pick-up signal is stored in a memory corresponding to the first phase (step S205). The memory is, for instance, a memory in the image sensor 108.

It is determined whether or not the phase of the modulation of the second light 9002 is the second phase (step S206). When the phase of the modulation of the second light 9002 is set to the first phase, the phase of the modulation of the second light 9002 is changed from the first phase to the second phase (step S211). With the phase of the modulation of the second light 9002 set to the second phase, an object based on the third light 9003 is finally picked up in accordance with steps S208, S209, S204, and S205. The image sensor 108 obtains an accumulated value of a group of pulses for 0.1 millisecond, for instance. An obtained image pick-up signal is stored in a memory corresponding to the second phase (step S205).

In step S206, when the phase of the modulation of the second light 9002 is set to the second phase, image pick-up signals corresponding to the first and second phases are respectively stored in corresponding memories. The image sensor 108 outputs the difference between both signals to the outside (step S210). For instance, when a fog is included in a range to be picked up, by determining the difference between the both signals, an adverse effect of multiple scattering of light due to the fog may be reduced and a difference image in which the reflection light from the object is enhanced may be obtained.

The processor 110 detects the object based on the difference information from the image sensor 108. The processor 110 may perform image analysis such as object recognition, for instance.

Fourth Embodiment

An image pickup system 10D, in which the relationship between the phase of the modulation of the first light 9001 and the phase of the modulation of the second light 9002 is fixed, will be described with reference to FIGS. 15 to 17D.

Figure 15:
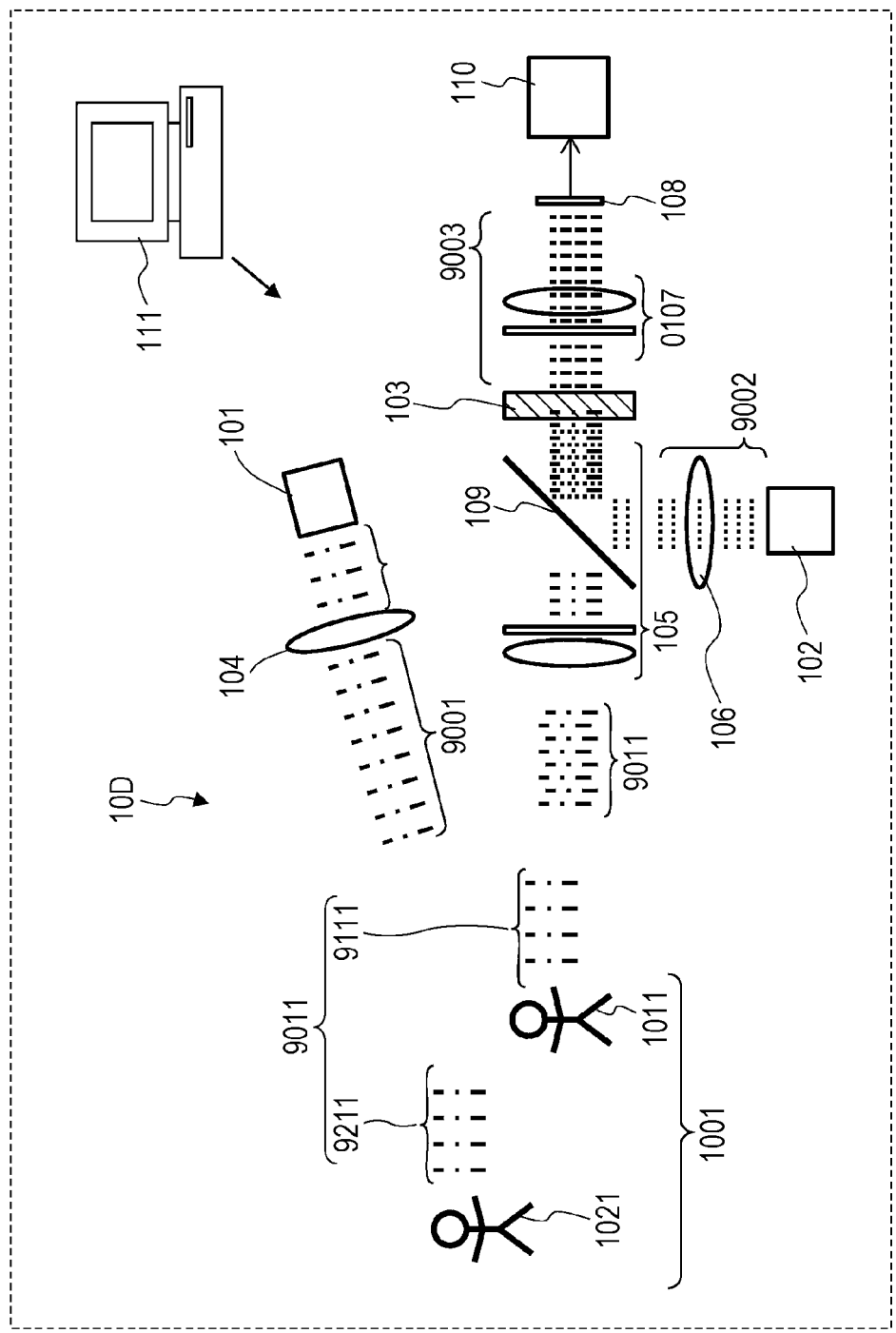
FIG. 15 is an illustration schematically depicting image pickup system according to an exemplary fourth embodiment.

FIG. 15 schematically illustrates the image pickup system 10D according to a fourth embodiment. The configuration of the present system is substantially the same as that of the second embodiment. Hereinafter, different points from the second embodiment will be mainly described and detailed description of similar points is omitted.

The first light source 101 generates the first light 9001 in which at least one of the intensity, the polarization state, and the wavelength changes periodically in time. In the present embodiment, the first light 9001 is assumed to be a pulsed light that has an intensity only in a short interval every fixed time. The first light 9001 may be light in which the polarization state or the wavelength changes periodically in time so as to achieve the phase matching with the later-described second light 9002 only in a short interval every fixed time in the nonlinear optical crystal 103. However, the phase of the modulation of the first light 9001 is fixed. Hereinafter, an example will be described in which the intensity periodically changes in time.

The object 1001 is irradiated with the first light 9001 by the first optical system 104. The object 1001 includes the object 1021 and the object 1011 at different distances. The object 1001 is irradiated with the first light 9001 in which at least one of the intensity, the polarization state, and the wavelength changes periodically in time. Part of the first light 9001 is reflected by the object 1001 and the reflection light 9011 is transmitted to the second optical system 105. The reflection light 9011 enters the nonlinear optical crystal 103 through the second optical system 105. The reflection light 9011 includes the reflection light 9211 from the object 1021 and the reflection light 9111 from the object 1011.

Figure 16A:
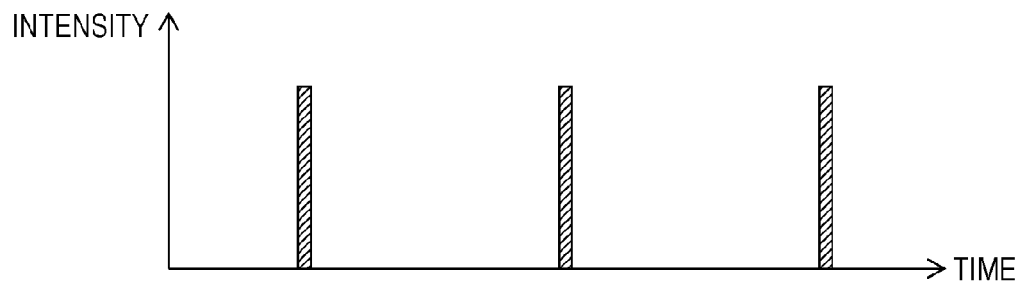
FIG. 16A is a graph illustrating the intensity of the first light.
Figure 16B:
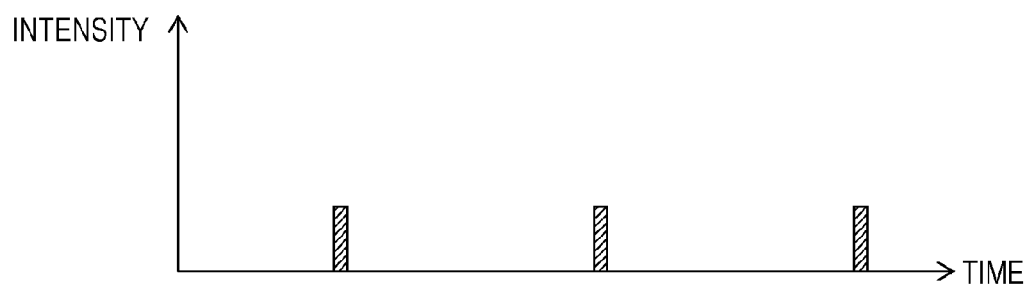
FIG. 16B is a graph illustrating the intensity of the reflection light.
Figure 16C:
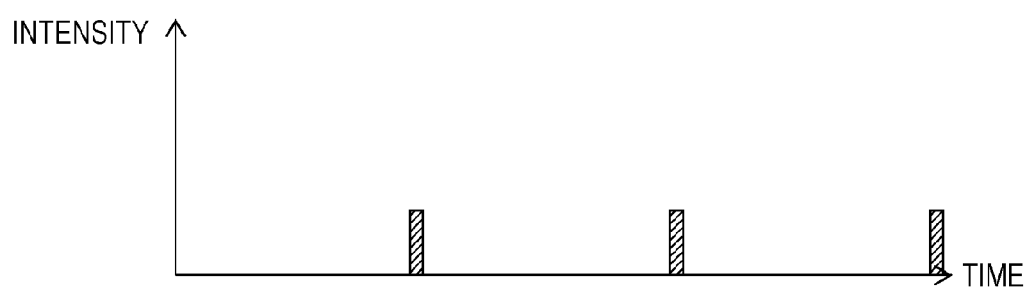
FIG. 16C is a graph illustrating the intensity of the reflection light.

FIG. 16A illustrates the intensity of the first light 9001. FIG. 16B illustrates the intensity of the reflection light 9111. FIG. 16C illustrates the intensity of the reflection light 9211. The reflection light 9011 includes the light reflected from the object 1001 including various objects. As described in the second embodiment, the phase of the modulation of each reflection light corresponds to the distance to a corresponding one of the object 1001. As illustrated in FIG. 16B, the intensity of the reflection light 9111 from the near object 1011 changes. Also, as illustrated in FIG. 16C, the reflection light 9211 from the far object 1021 changes and has a delayed phase compared with the reflection light 9111.

The second light source 102 generates the second light 9002 in which at least one of the intensity, the polarization state, and the wavelength changes periodically in time. Any of the intensity, the polarization state, and the wavelength may change. Also, the phase of the modulation of the second light 9002 is fixed. Hereinafter, an example will be described in which the intensity periodically changes in time similarly to the first light source 101.

In the present embodiment, the second light 9002 is assumed to have an intensity only in a certain interval periodically. The second light 9002 may be light that has a polarization state or a wavelength that achieves phase matching with the reflection light 9011 of the first light 9001 only in a certain interval periodically in the nonlinear optical crystal 103. The period of the modulation of the second light 9002 is made to be matched with the period of the modulation of the first light 9001. However, regarding the second light 9002, the width of an interval having an intensity, or the width of an interval having a polarization state or a wavelength that achieves phase matching with the reflection light 9011 does not have to be matched with the pulse width of the first light 9001. Hereinafter, an example will be described in which the width of the interval is 33 nanoseconds.

Figure 17A:
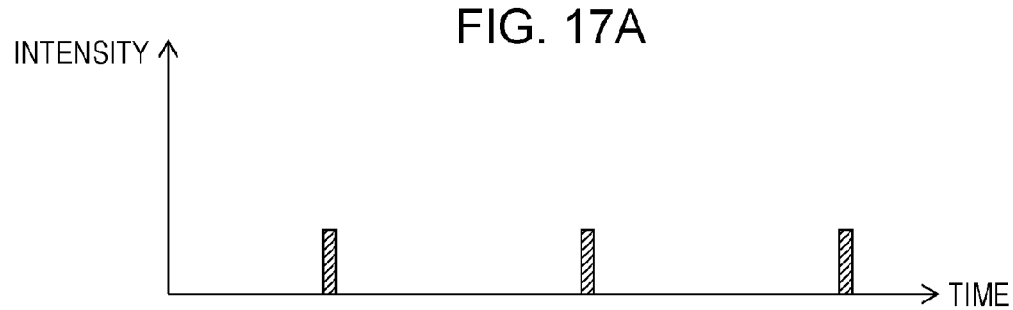
FIG. 17A is a graph illustrating the variation in time of the reflection light from a near object.
Figure 17B:
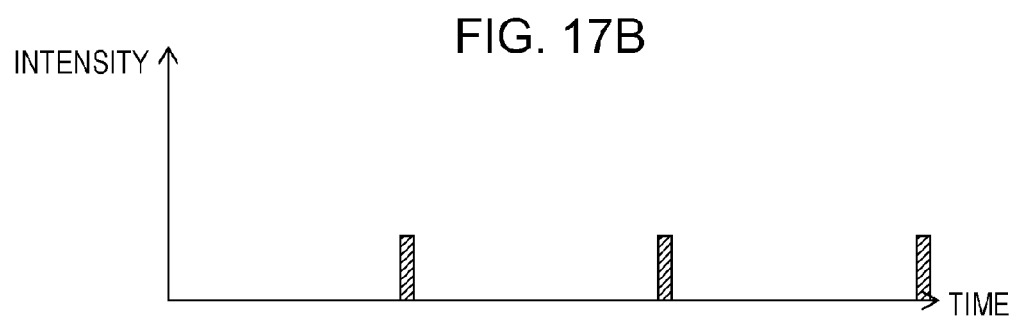
FIG. 17B is a graph illustrating the variation in time of the reflection light from a far object.
Figure 17C:
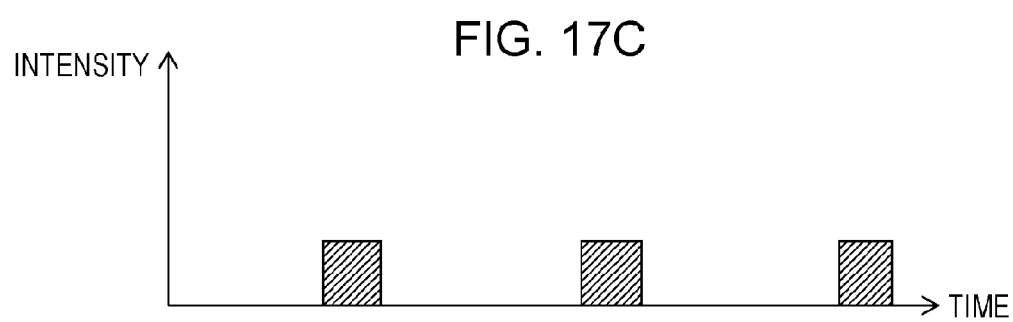
FIG. 17C is a graph illustrating the variation in time of the second light.
Figure 17D:
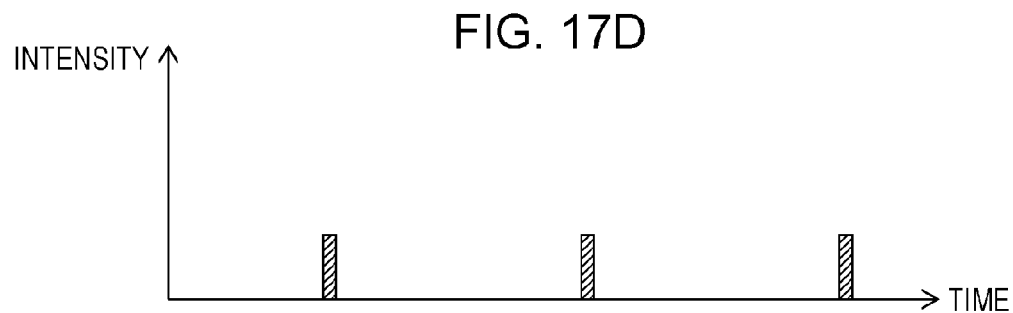
FIG. 17D is a graph illustrating the variation in time of the third light.

FIG. 17A illustrates the variation in time of the intensity of the reflection light 9111 from the near object 1011. FIG. 17B illustrates the variation in time of the intensity of the reflection light 9211 from the far object 1021. FIG. 17C illustrates the variation in time of the intensity of the second light 9002. FIG. 17D illustrates the variation in time of the intensity of the third light 9003 generated by the nonlinear optical crystal 103.

As illustrated in FIG. 17D, only in an interval in which the pulse of the reflection light 9111 or the reflection light 9211 overlaps with the pulse of the second light 9002, SFG phenomenon occurs in the nonlinear optical crystal 103 and the third light 9003 is generated. At this point, the phases of the modulation of the reflection light 9111 and the reflection light 9211 correspond to the distances to the objects 1011 and 1021, respectively. Thus, when the phase relationship between the phase of the modulation of the first light 9001 and the phase of the modulation of the second light 9002 is fixed, only an object(s) in a distance range corresponding to an interval in which both pulses overlap is picked up. The above-mentioned time of 33 nanoseconds corresponds to a distance of 10 m to the object 1001. That is, only an object within a distance of 10 m may be picked up. Of course, a distance range for image pick up may be set in any way based on the period of the modulation of the second light 9002 and the pulse width of the second light 9002.

Such an image pick-up technology that picks up an object in a specific distance range is useful for safety measures and security application. For instance, when the image pickup system 10D, which is set to pick up only an object(s) within a distance of 10 m, is mounted in a vehicle, a warning may be issued when a certain object is picked up. In this manner, the measurement system according to the present disclosure may be utilized as collision prevention measures.

In addition, a system may be constructed that picks up the surrounding area of a building where people are generally not allowed to enter, and only when a suspicious person intrudes, an image is picked up. Only when such an incident happens, a warning may be issued and the incident may be recorded. In this manner, the measurement system according to the present disclosure may function as a monitoring system.

A measurement system according to the present disclosure may be utilized as, for instance, a pedestrian/obstacle detection device or a ranging device for in-vehicle application.

The present disclosure further includes the light source units and the measurement methods stated in the following items.

[Item 1]

A light source unit including: a first light source that generates first light and irradiates an object with the first light, at least one of an intensity, a polarization state, and a wavelength being modulated with a first period in the first light; a second light source that generates second light, at least one of an intensity, a polarization state, and a wavelength being modulated with a second period in the second light; an optical system that mixes light from the object based on the first light with the second light to generate mixed light.

[Item 2]

The light source unit according to Item 1, further including a nonlinear optical crystal that generates third light from the mixed light by sum-frequency generation phenomenon, the third light having a frequency equivalent to a sum of a frequency of the light from the object based on the first light and a frequency of the second light.

[Item 3]

A measurement method including: generating first light and irradiating an object with the first light, at least one of an intensity, a polarization state, and a wavelength being modulated with a first period in the first light; generating second light, at least one of an intensity, a polarization state, and a wavelength being modulated with a second period in the second light; mixing the light from the object based on the first light with the second light to generate mixed light; generating third light from the mixed light by sum-frequency generation phenomenon, the third light having a frequency equivalent to a sum of a frequency of the light from the object based on the first light and a frequency of the second light; and measuring an intensity of the third light.

[Item 4]

A measurement method including: generating first light and irradiating an object with the first light, at least one of an intensity, a polarization state, and a wavelength being modulated with a first period in the first light; generating second light, at least one of an intensity, a polarization state, and a wavelength being modulated with a second period in the second light; and measuring a relative relationship between a phase of modulation of the light from the object based on the first light and a phase of modulation of the second light.

What is claimed is:

1. A measurement system, comprising:
    a first light source that generates first light and irradiates an object with the first light, at least one of an intensity, a polarization state, and a wavelength being modulated with a first period in the first light;
    a second light source that generates second light, at least one of an intensity, a polarization state, and a wavelength being modulated with a second period in the second light;
    a first optical system that mixes light from the object based on the first light with the second light to generate mixed light;
    a nonlinear optical crystal that generates third light from the mixed light by sum-frequency generation phenomenon, the third light having a frequency equivalent to a sum of a frequency of the light from the object based on the first light and a frequency of the second light; and
    a photodetector that measures an intensity of the third light.

2. The measurement system according to claim 1, further comprising a controller,
    wherein the controller sets any one of at least two phases different from each other selectively to the first light source as a phase of modulation of the first light,
    the first light source generates the first light which has the phase of modulation set by the controller.

3. The measurement system according to claim 1, further comprising a controller,
    wherein the controller sets any one of at least two phases different from each other selectively to the second light source as a phase of modulation of the second light,
    the second light source generates the second light which has the phase of modulation set by the controller.

4. The measurement system according to claim 1,
    wherein the first period is substantially equal to the second period.

5. The measurement system according to claim 1,
    wherein the third light has a wavelength included in a visible light wavelength range.

6. The measurement system according to claim 1,
    wherein the photodetector has higher sensitivity to the third light than to the first and second light.

7. The measurement system according to claim 1,
    wherein the photodetector has substantially no sensitivity to the first and second light.

8. The measurement system according to claim 1, further comprising a second optical system,
    wherein the photodetector comprises an image sensor, and the second optical system condenses the third light on the image sensor.

9. The measurement system according to claim 8,
    wherein the image sensor is an organic image sensor.

10. The measurement system according to claim 8, further comprising
    a controller, and
    a processor,
    wherein the controller sets at least two phases different form each other selectively to the first light source as a phase of modulation of the first light,
    the first light source generates the first light which has the phase of modulation set by the controller,
    the image sensor obtains a first image signal when the phase of modulation of the first light is a first phase,
    the image sensor obtains a second image signal when the phase of modulation of the first light is a second phase different from the first phase, and
    the processor detects the object based on a difference between a first image signal and a second image signal.

11. The measurement system according to claim 8, further comprising
    a controller, and
    a processor,
    wherein the controller sets at least two phases different form each other selectively to the second light source as a phase of modulation of the second light,
    the second light source generates the second light which has the phase of modulation set by the controller,
    the image sensor obtains a first image signal when the phase of modulation of the second light is a first phase, the image sensor obtains a second image signal when the phase of modulation of the second light is a second phase different from the first phase, and the processor detects the object based on a difference between a first image signal and a second image signal.

12. The measurement system according to claim 1, further comprising a processor that measures a distance from the first light source to the object based on the intensity.

13. The measurement system according to claim 1, wherein the first light has a wavelength included in an infrared light wavelength range.

14. A measurement system, comprising:

a first light source that generates first light and irradiates an object with the first light, at least one of an intensity, a polarization state, and a wavelength being modulated with a first period in the first light;

a second light source that generates second light and irradiates with the second light, at least one of an intensity, a polarization state, and a wavelength being modulated with a second period in the second light;

an optical element that generates third light from the second light and light from the object based on the first light, the third light including information on relative relationship between a phase of modulation of the second light and a phase of modulation of the light from the object based on the first light; and a photodetector that measures an intensity of the third light.

15. A measurement system, comprising:

a first light source that generates first light and irradiates an object with the first light, at least one of an intensity, a polarization state, and a wavelength being modulated with a first period in the first light;

a second light source that generates second light and irradiates with the second light, at least one of an intensity, a polarization state, and a wavelength being modulated with a second period in the second light; and a measurement device that measures a relative relationship between a phase of modulation of the second light and a phase of modulation of light from the object based on the first light.

* * * * *